United States Patent
Tully et al.

(10) Patent No.: US 10,118,713 B2
(45) Date of Patent: *Nov. 6, 2018

(54) ELECTRIC UNMANNED AERIAL VEHICLE LAUNCHER

(71) Applicant: Engineered Arresting Systems Corporation, Aston, PA (US)

(72) Inventors: Andrew Tully, Chester Springs, PA (US); Dennis Page, Shillington, PA (US); Robert Withers, Logan Township, NJ (US); Kenneth Neeld, West Chester, PA (US); Richard L. Orner, Jr., Oreland, PA (US); Kirk F. Schneider, Springfield, PA (US); Scott J. Whitsel, Boothwyn, PA (US)

(73) Assignee: Engineered Arresting Systems Corporation, Aston, PA (US)

( * ) Notice: Subject to any disclaimer, the term of this patent is extended or adjusted under 35 U.S.C. 154(b) by 261 days.

This patent is subject to a terminal disclaimer.

(21) Appl. No.: 14/999,290

(22) Filed: Apr. 20, 2016

(65) Prior Publication Data

US 2016/0347477 A1    Dec. 1, 2016

Related U.S. Application Data

(63) Continuation-in-part of application No. 14/469,767, filed on Aug. 27, 2014, now Pat. No. 9,783,322.

(60) Provisional application No. 61/870,281, filed on Aug. 27, 2013.

(51) Int. Cl.
*B64F 1/08* (2006.01)

(52) U.S. Cl.
CPC .......... *B64F 1/08* (2013.01); *B64C 2201/084* (2013.01)

(58) Field of Classification Search
CPC ................. B64C 2201/084; B64C 2201/08
USPC ............................................... 244/63
See application file for complete search history.

(56) References Cited

U.S. PATENT DOCUMENTS

| | | | |
|---|---|---|---|
| 1,960,264 | A | 5/1934 | Ernst |
| 2,672,306 | A | 3/1954 | Doolittle |
| 3,534,929 | A | 10/1970 | Johansen et al. |
| 4,678,143 | A | 7/1987 | Griffin |
| 4,909,458 | A | 3/1990 | Martin |

(Continued)

FOREIGN PATENT DOCUMENTS

| | | |
|---|---|---|
| CN | 102826233 | 12/2012 |
| EP | 0057680 | 7/1986 |

(Continued)

OTHER PUBLICATIONS

Europe Patent Application No. 14861600.6, Extended Search Report dated Mar. 29, 2017, 7 pages.

(Continued)

*Primary Examiner* — Christopher P Ellis
(74) *Attorney, Agent, or Firm* — Kilpatrick townsend & Stockton LLP; Dean W. Russell; Kristin M. Crall

(57) ABSTRACT

Embodiments of the present invention provide improvements to UAV launching systems. The disclosed launching system eliminates the use of hydraulic fluid and compressed nitrogen or air by providing an electric motor-driven tape that causes movement of a shuttle along a launcher rail. The shuttle is detachable from the motor-driven tape, such that stoppage of the tape can be separate from stoppage of the shuttle. Embodiments further provide a secondary arrestment strap. Further embodiments provide an anti-rollback latch system.

20 Claims, 19 Drawing Sheets

(56) References Cited

U.S. PATENT DOCUMENTS

| | | | |
|---|---|---|---|
| 5,695,153 A | 12/1997 | Britton | |
| 6,457,673 B1 | 10/2002 | Miller | |
| 6,851,647 B1 | 2/2005 | Rosenbaum | |
| 7,165,745 B2 | 1/2007 | McGeer | |
| 7,210,654 B1 | 5/2007 | Cox | |
| 7,562,843 B2 | 7/2009 | Lipponen | |
| 7,594,624 B2 | 9/2009 | Yamamoto | |
| 7,665,691 B2 | 2/2010 | Hanzlick | |
| 8,336,816 B2 | 12/2012 | Miller | |
| 8,453,770 B2 | 6/2013 | Tang | |
| 8,511,607 B2 | 8/2013 | Robinson | |
| 2009/0314883 A1 | 12/2009 | Arlton | |
| 2015/0060600 A1 | 3/2015 | Tully et al. | |

FOREIGN PATENT DOCUMENTS

| | | |
|---|---|---|
| GB | 316150 | 3/1930 |
| WO | 2003057334 A1 | 7/2003 |
| WO | 2004024562 A1 | 3/2004 |
| WO | 2015046785 | 4/2015 |

OTHER PUBLICATIONS

International Patent Application No. PCT/US2014/052829, Search Report and Written Opinion, dated Apr. 28, 2015.
U.S. Appl. No. 14/469,767, Non-Final Rejection, dated Apr. 21, 2017.
International Patent Application No. PCT/US2017/028049, Search Report and Written Opinion, dated Sep. 11, 2017.

ELECTRIC UNMANNED AERIAL VEHICLE LAUNCHER

CROSS REFERENCE TO RELATED APPLICATIONS

This application is a continuation in part of U.S. Ser. No. 14/469,767 filed on Aug. 27, 2014 titled "Electric Unmanned Aerial Vehicle Launcher," which application claims the benefit of U.S. Provisional Application Ser. No. 61/870,281, filed Aug. 27, 2013, titled "Electric UAV Launcher," the entire contents of each of which are hereby incorporated by reference.

FIELD OF THE DISCLOSURE

Embodiments of the present disclosure relate generally to an electrically powered launcher system designed to launch an unmanned aerial vehicle (UAV). The embodiments of this electrically powered launch system provided are generally more lightweight than current hydraulic-pneumatic launching systems. They also do not use hydraulic fluids and fuel for an engine for the launching process. This renders the system environmentally sound because fumes and spills may be eliminated. Through the use of feedback-based controls tied into a drive motor, the launch acceleration profile can be programmed and potential g-load spikes mitigated.

BACKGROUND

Launching systems for unmanned aerial vehicles (UAV) are designed to create enough force and speed that the UAV can be ejected into the air. The general concept behind a UAV launching system is to take a vehicle from rest to the desired flight velocity in a minimum distance, without imparting destructive forces to the vehicle. UAV launcher systems for vehicles weighing thirty pounds or more typically use a pneumatic or pneumatic/hydraulic system as the prime propulsion system.

The traditional approach to take-off for many UAV's (including taxi, accelerate, lift-off, and climb) often requires a distance of 200 feet or more. This traditional take-off minimizes the acceleration (g-load) on the vehicle because it is accelerated over a longer distance. However, there is a desire to design systems that can obtain the desired launch velocity in less than 50 feet in some instances. For example, on shipboard applications and other instances, space may be limited. In addition, the landing gear associated with runway take-off and landing operations adds weight and thus requires more power and fuel to sustain flight operations.

However, the use of a launcher that allows shorter distance to achieve flight (because the acceleration is faster) generally means higher g-loads. There are often expensive electronics on-board the UAV that cannot withstand such high g-loads. Other limitations to launch parameters include a minimum launch velocity or a maximum space to launch. The design and optimization of the launcher then becomes a balance of launch stroke length, vehicle acceleration, vehicle weight to be launched, and launch angle.

The power source for the UAV launchers designed to date has typically been a self-contained power source in the form of a closed loop hydraulic/pneumatic system, which stores energy when dry nitrogen is compressed in an accumulator by pumping in hydraulic fluid. The hydraulic pump is usually driven by either an electric motor, a gasoline engine, or by a multi-fuel engine.

Historically, closed loop hydraulic-pneumatic systems have proven to be the most reliable and repeatable under the widest range of environmental conditions. To prevent condensation at extreme temperatures, dry nitrogen ($GN_2$) is used, instead of air, to fill the "pneumatic" side of a piston accumulator. The nitrogen is pre-charged to a pre-determined pressure. A hydraulic pump then pressurizes the hydraulic side of the accumulator piston, which compresses the nitrogen and raises the launch pressure. Once the optimal launch pressure is reached, the system holds the pressure via check valves until launch is initiated. Upon launch initiation, the valve opens, the nitrogen expands, pushing the fluid out of the accumulator and into the cylinder. This accelerates the cylinder piston, the reeving cable, shuttle and vehicle.

However, there are some limitations and problems associated with pneumatic launchers. For example, there is typically an accumulator associated with the system that must be pre-charged to a specific pressure to achieve the desired launch velocity for a given UAV weight. If a different speed is required or if the weight of the UAV varies (due to fuel load or ordinance), the pre-charge pressure must be adjusted accordingly. This generally requires that gas (typically air or dry nitrogen) either be bled from or added to the system via a separate gas bottle. The need to vary the pressure adds to system complexity and potentially increases the overall system weight (e.g., if a gas bottle positioned on-board the launcher is used).

With a pneumatic launcher, it can be also difficult to control the g-load imparted to the UAV when the pressure is released into the mechanical drive components at the initiation of the launch cycle. These spikes in the g-load at the beginning of the launch cycle can have potentially disastrous impacts on the UAV and the on-board electronics and other systems. These initial g-load spikes can be mitigated through control valves that release the hydraulic fluid from the accumulator into the drive cylinder in a controlled fashion. However, these valves are often expensive and add weight to the overall system.

Additionally, many UAV launchers are used in an expeditionary mode, where they need to be mobile and capable of being transported to a location for deployment. In some cases, they may be mounted to the back of a truck. In other cases, they may be trailer mounted and either towed into position or slung from the underside of a helicopter and air lifted into position. In most cases, the overall size and weight of the launcher system must be minimized to ensure that it can fit within certain aircraft or transport containers. The main drive components of a hydraulic/pneumatic launcher (accumulator, pump, launch cylinder, gas bottle, reservoir, etc.) add substantial weight to the system, and weight is a primary limitation to mobility of the system.

With any hydraulic/pneumatic system, leaks are always a concern. Loss of gas pressure or a hydraulic leak could potentially shut down operations. Once fielded, it is unlikely that there will be access to gas cylinders to address leaks in the system.

Launch timing can also be an issue with a hydraulic/pneumatic system. Depending on the differential between the pre-pressure and final launch pressure, the size of the pump and amount of hydraulic fluid to be moved, it can take up to several minutes to bring the system up to launch pressure. The UAV is typically mounted on the launcher, and its engine is running during this pressurization time, making it susceptible to overheating.

Reset can be another challenge presented by a hydraulic/pneumatic system. Resetting a hydraulic/pneumatic launcher after completion of a launch requires that the shuttle be pulled back into the launch position. This may take several minutes because, as the shuttle is pulled back, the hydraulic fluid needs to be pushed out of the cylinder and back into the reservoir. The time required to reposition the shuttle negatively impacts the overall cycle time.

One launcher design that does not use a hydraulic system is described in U.S. Pat. No. 4,678,143. The launcher described by this patent uses a flywheel that provides the energy required for the launch sequence. The flywheel is spun up by a small electric motor that is powered by a generator, and an electric clutch engages the flywheel when the launch cycle is initiated. The flywheel drives a cable drum that wraps cable around the drum during the launch sequence. One of the disadvantages with this launcher is that the flywheel may take several minutes to come up to launch speed. Another disadvantage is the requirement of a generator as a power source, which can add a great deal of weight to the system.

BRIEF SUMMARY

Improvements to UAV launching systems are thus desirable. In particular, improvements that eliminate the use of hydraulic fluid and compressed nitrogen or air are desirable. Improvements that eliminate the use of a flywheel to provide energy for a launch sequence are desirable. Systems that are lighter, more reliable, allow more control of g-load, that do not threaten leaks, that do not take several minutes to launch, and that do not take several minutes to re-set are desirable.

Embodiments described herein thus provide a launching system for an unmanned aerial vehicle that uses a launcher rail, a shuttle configured to travel along the launcher rail, and a drive mechanism for moving the shuttle along the launcher rail. The drive mechanism can include a length of tape secured to the shuttle, an electric drive motor that drives movement of the tape, and a drive reel to which one end of the tape is secured and around which the tape is wound during launch. The tape may be nylon, a nylon blend, or some other material. The electric motor may be a DC motor or some other motor that comports with the weight and size requirements for the particular system. The electric motor may be battery powered. In a specific design, the electric motor is powered by a Lithium Ion battery.

This disclosure provides a UAV launching system that provides launch using completely electric launch components, including the braking and control system. There are no hydraulic systems on board that could present environmental issues in the event of a leak. The launch system described may be mounted to a base or pallet that can in turn be mounted to a trailer, dolly type wheel base, a flat bed truck, train flat car, ship deck, or any other appropriate launching location or surface. The modularity of the components used also allows scalability for higher energy UAV launches.

Embodiments further provide a shuttle that is detachable from the motor-driven tape, such that stoppage of the tape can be separate from stoppage of the shuttle. Embodiments further provide a secondary arrestment strap. Further embodiments provide an anti-rollback latch system.

BRIEF DESCRIPTION OF THE DRAWINGS

FIG. 27A shows the system prior to engagement of the strap. FIG. 27B shows the system during the engagement of the strap, with the pivoting latch beginning to open. FIG. 27C shows the system with the strap positioned against the strap shoe and the pivoting latch in the fully open position. FIG. 27D shows the system with the pivoting latch closed. FIG. 27E shows the system with the pivoting latch closed and the strap engaged against a rear face of the latch.

DETAILED DESCRIPTION

UAV launchers may be offered with fixed or mobile installation, various rail options (telescoping rails or elongated fixed rails), manual or automated operation, and designed for a variety of UAV configurations and designs based on desired performance and cycle times. The systems described herein may be used on any of the various types of launching systems. In one embodiment, the launching system described may be mounted on a motor vehicle that can transport the launching system to the desired location for launch. The launch may occur while the system is on the vehicle, or the system may be removed from the vehicle for launch. In another embodiment, the launching system described may be installed at a fixed location.

Figure 1:
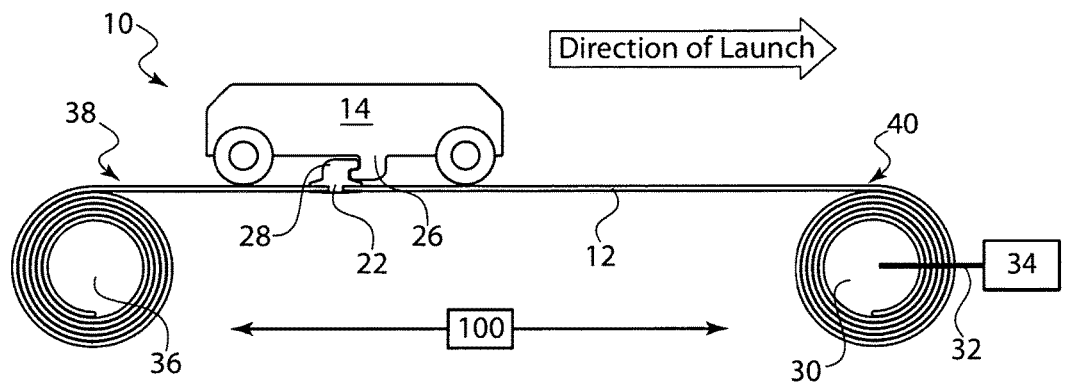
FIG. 1 shows a side plan schematic view of one embodiment of a launching system, using an electric motor-driven power reel and a payout reel to move a shuttle along a tape.
Figure 2:
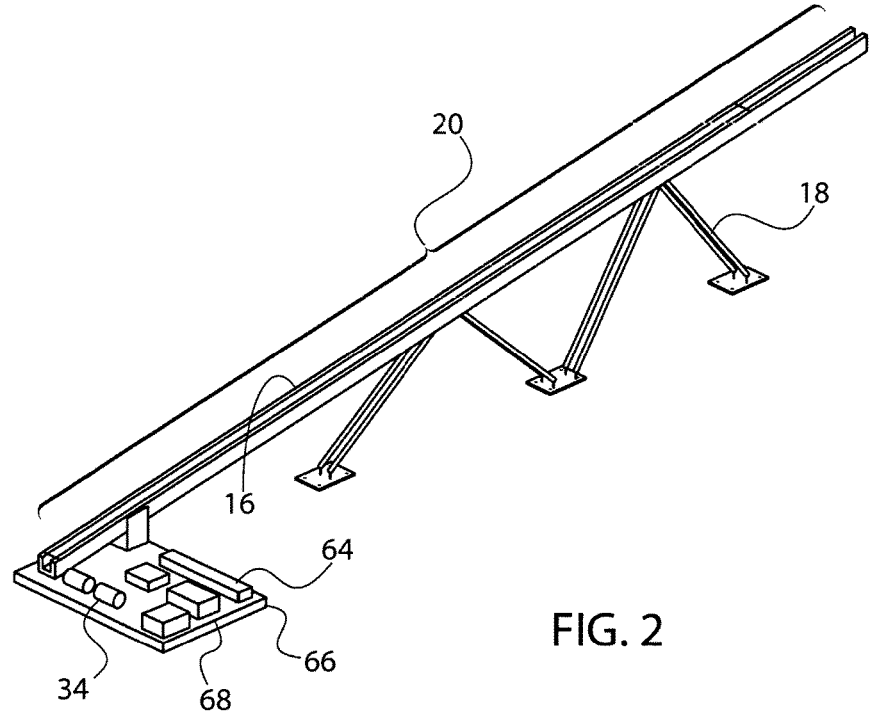
FIG. 2 shows a perspective view of a launcher rail at an angle, without a shuttle in place.

As shown in FIG. 1, in one embodiment, there is provided a launching system 10 that uses a motor-driven belt or tape mechanism 12 that is attached to a shuttle assembly 14. The shuttle 14 is the carrier that transfers the energy required for launch to the UAV. As shown in FIG. 2, the shuttle 14 may travel along a length of a launcher rail 16. The launcher rail 16 is typically inclined. This incline may be achieved by struts 18 that rest on a surface or are secured to a surface. Struts may be secured to a base or pallet that may be mounted to a trailer, wheel base, flat bed truck, train flat car, ship deck, or any other surface or vehicle designed for launching. Alternatively, the struts may rest on a ground surface. The launcher rail 16 may be a fixed track of fixed length or it may have an extendable boom that elongates the rail. For example, the extendable boom may be hinged, such that it could be folded and the length would not be obtrusive to typical transport methods. In another embodiment, the extendable boom may be driven out from a retracted position, or may be extended in any other appropriate manner to elongate the launcher rail 16 into an extended track if needed. The launcher rail 16 length is typically contingent on the distance required to achieve the desired final launch velocity, without exceeding a pre-defined g-load threshold of the UAV, as well as the distance required to stop or arrest the shuttle. FIG. 2 also shows that one or more batteries 64 may be positioned on a base 66, along with one or more motor control components 68.

Figure 3A:
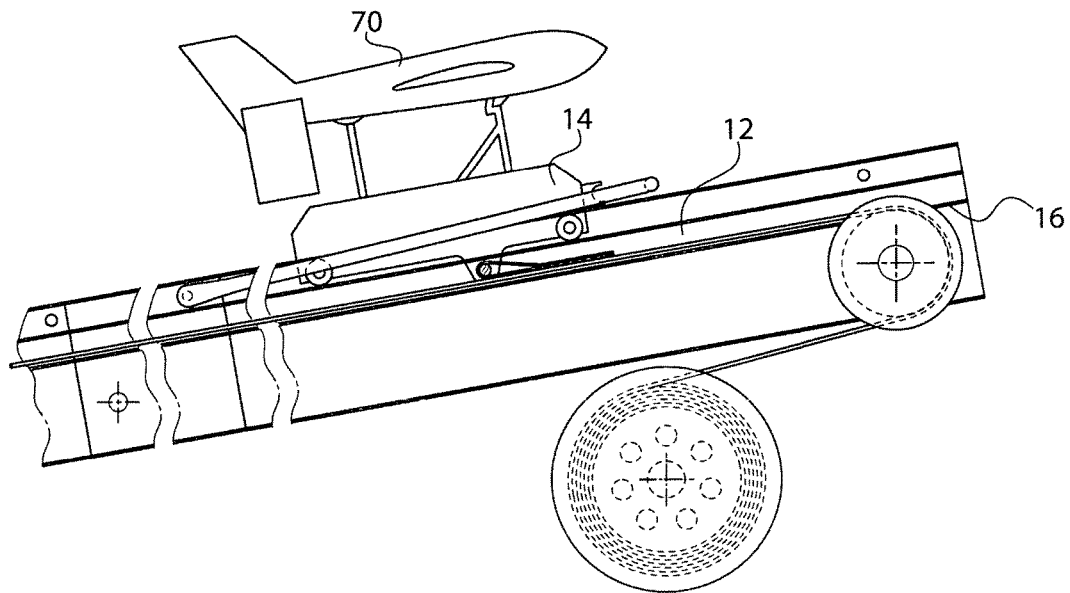
FIGS. 3A-C show a launch series with a UAV being released from a shuttle.
Figure 3B:
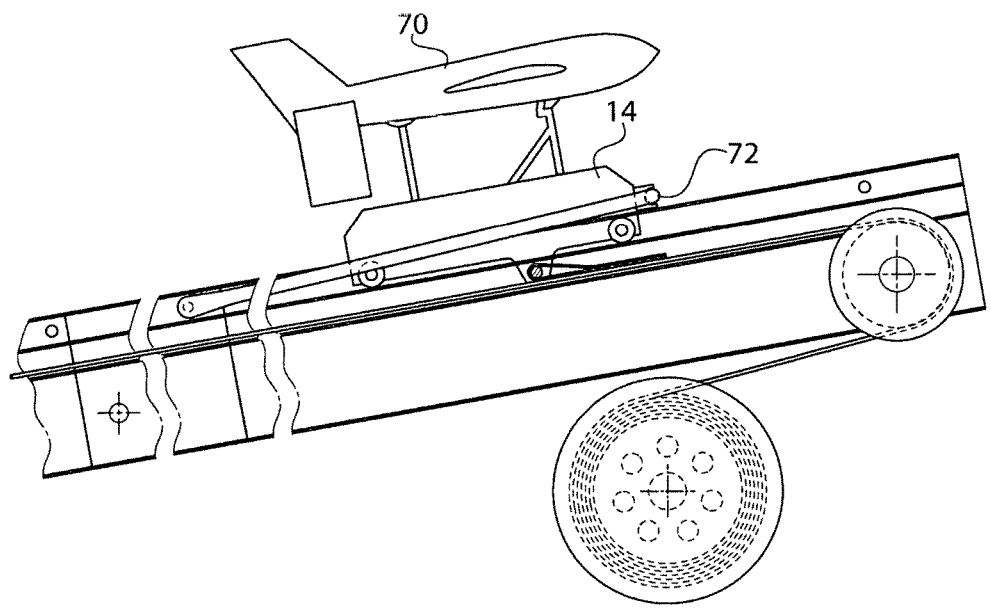
Figure 3C:
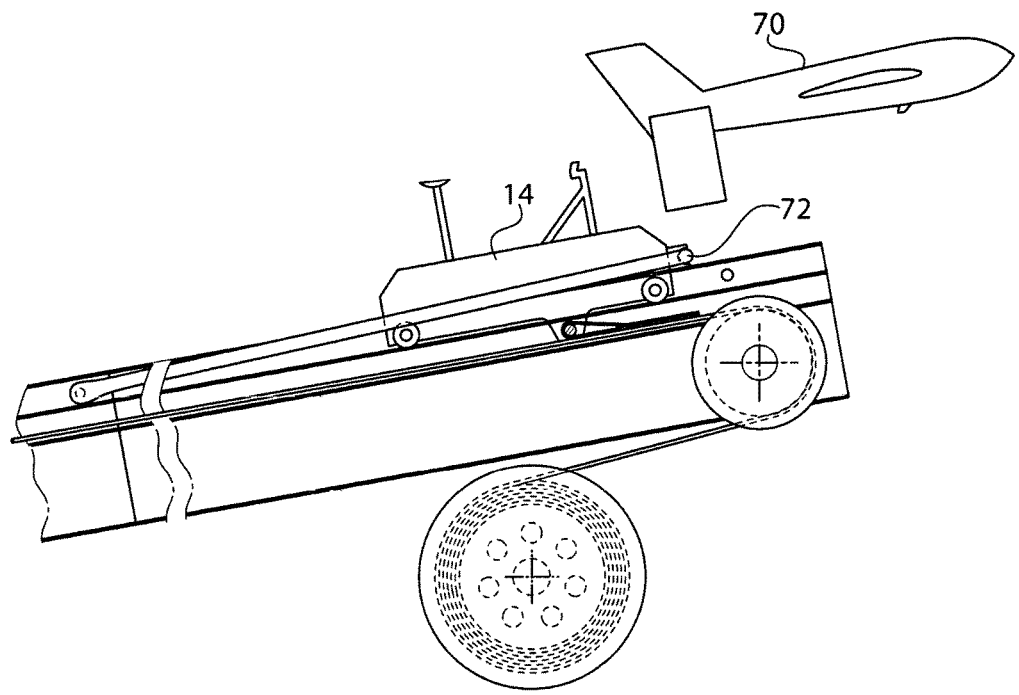

The launcher rail 16 may be used to guide the shuttle 14 along the drive length 20 of the rail 16, in the direction of launch, illustrated by the arrow in FIG. 1. (For ease of review, FIG. 1 does not show a launcher rail or an incline, although both would generally be incorporated into a final launch system.) As the shuttle 14 travels along the rail 16, the motion of the shuttle 14 transfers the launch velocity to the UAV. (FIG. 1 does not show a UAV secured to the shuttle 14. FIGS. 3A-C show a potential launch sequence.)

Rather than securing a cable to the front of the shuttle, which is how most current launching systems work, the shuttle 14 is secured to a tape 12 that runs the length of the launcher rail 16. More specifically, a belt or tape 12 is used to cause movement of the shuttle 14 along the launcher rail 16. The shuttle 14 is generally secured to the tape 12 at a shuttle to tape interface 22. This interface 22 may be any appropriate connection. In one embodiment, the shuttle to tape interface 22 may be provided as a pin 24 attached to the tape that cooperates with a corresponding structure on the shuttle 14. This embodiment is shown in FIGS. 3A-C and 15. For example, the undercarriage of the shuttle may have a hook 26 or some other detachable connection feature attached thereto that cooperates with the pin 24. In another embodiment, the interface 22 may be formed from any type of upward protrusion 28 on the tape 12 that is shaped to cooperate with a lower protrusion or hook on the shuttle. In another embodiment, the interface 22 may be an non-detachable connection between the shuttle and the tape. In another embodiment, the interface may be formed as a clamp, where the shuttle secures two ends of the tape to one another at a location on the shuttle. Other connections are possible and within the scope of this disclosure.

In use, a UAV is secured to an upper surface of the shuttle 14 as shown in FIGS. 3A-C. The attachment of the UAV to the shuttle 14 may be via any appropriate connection currently in use or as may be developed, including any of the above described options. An abrupt stoppage of the shuttle 14 causes the UAV to launch off of the shuttle 14.

Figure 7:
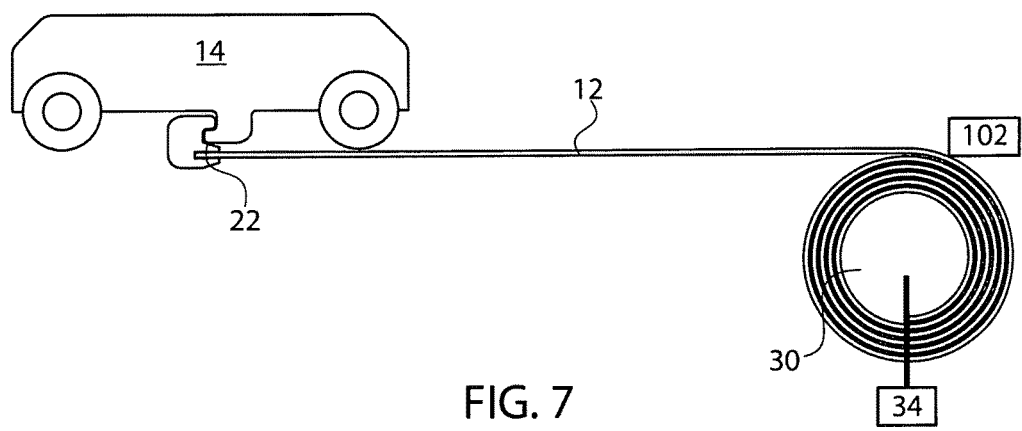
FIG. 7 shows a side plan schematic view of a launching system that uses a power reel, without a payout reel.
Figure 8:
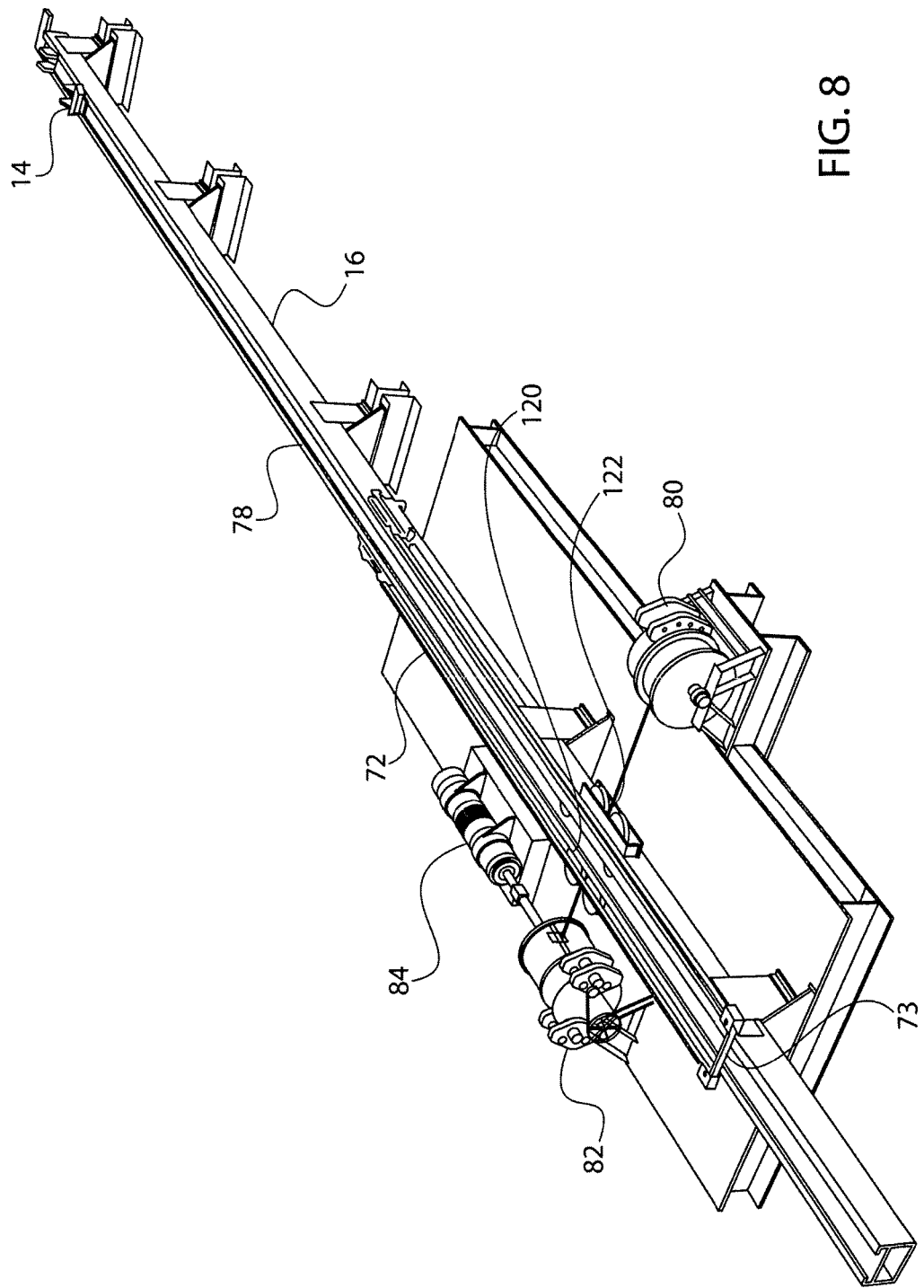
FIG. 8 shows a side perspective view of a launching system that uses a cable wrapped around a drum, driven by the motor, and pulleys on the shuttle.
Figure 9:
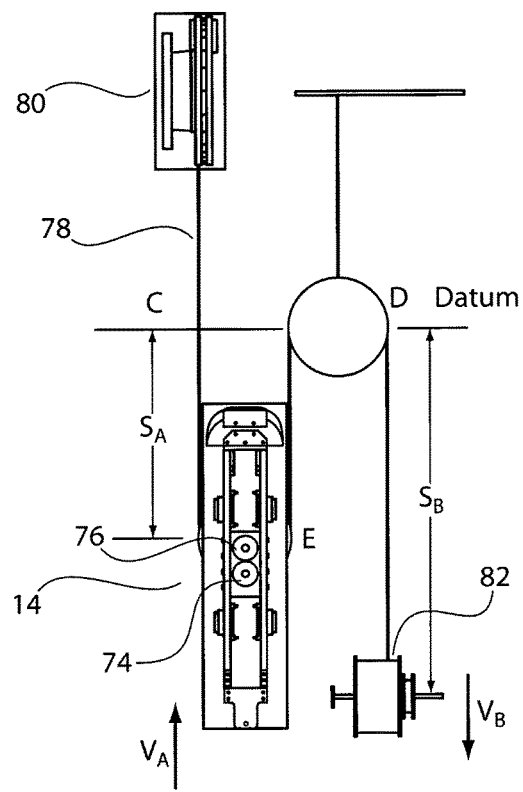
FIG. 9 shows a free body diagram of the embodiment of FIG. 8.
Figure 11:
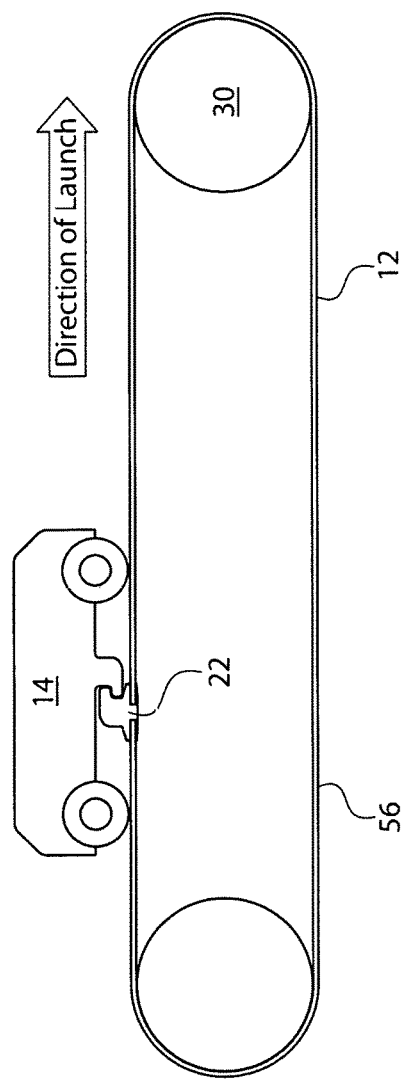
FIG. 11 shows a side plan schematic view of a launching system that uses a conveyor belt.
Figure 12:
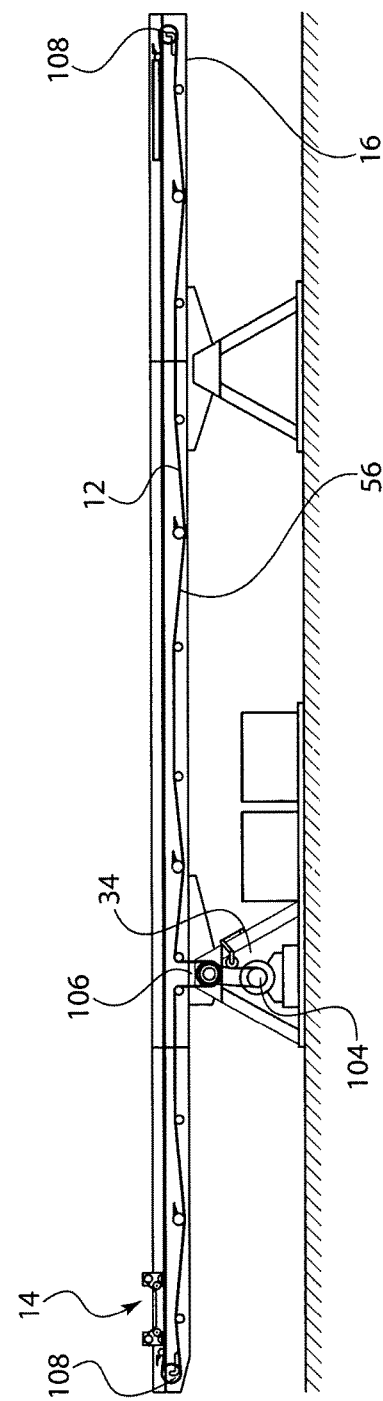
FIG. 12 shows a side view of an alternate conveyor belt system.
Figure 13:
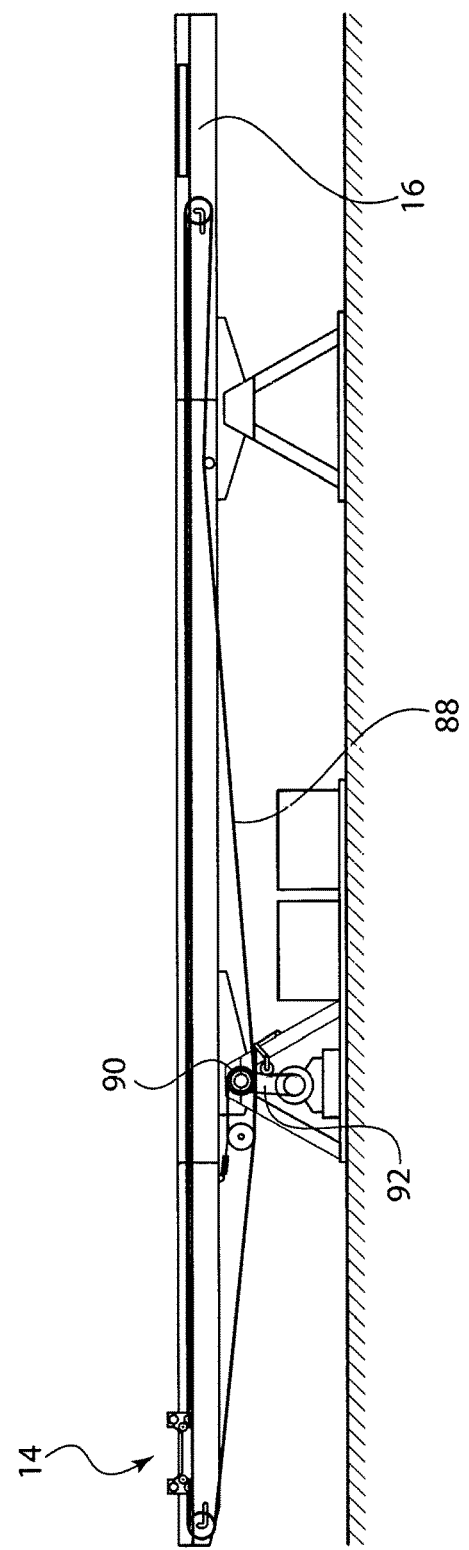
FIG. 13 shows a side view of a launching system using a steel cable wound around a drum and driven by an electric motor.
Figure 14A:
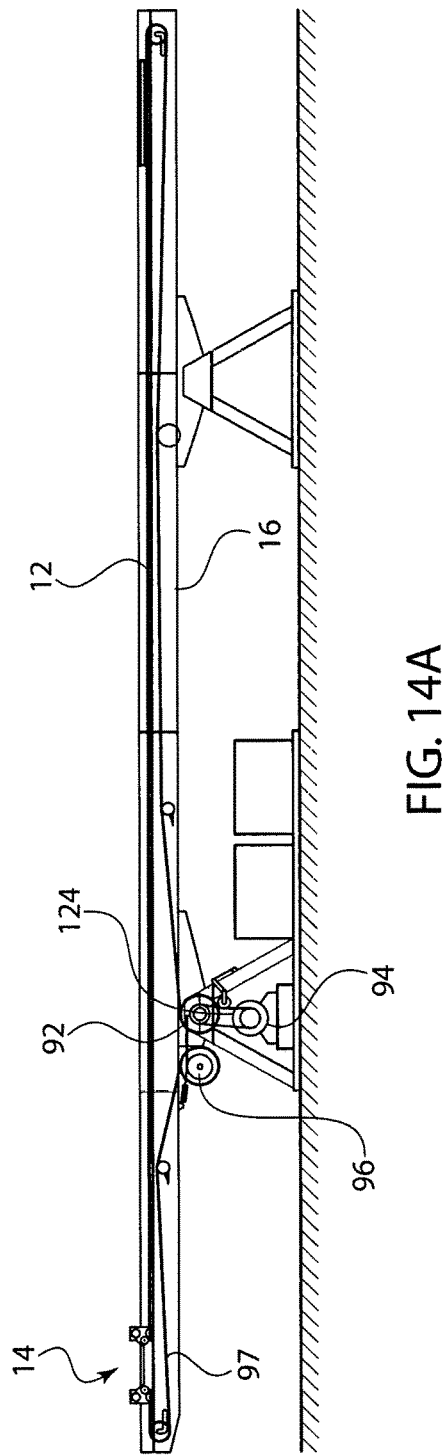
FIG. 14A shows one embodiment of a braking system that may be used for a launching system.
Figure 14B:
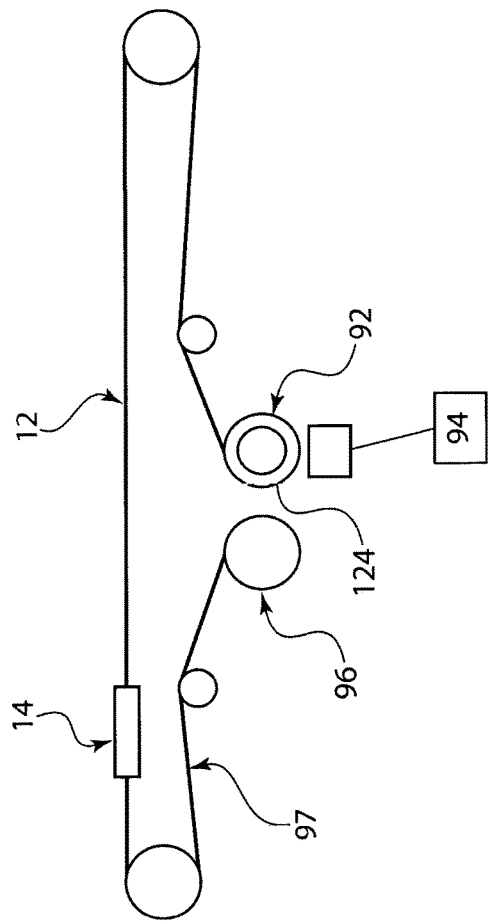
FIG. 14B shows a schematic view of the braking system of FIG. 14A.

The tape 12 may run along the drive length 20 of the launcher rail 16. In one embodiment, its ends are generally secured to one or more of a payout reel 36 and/or a power reel 30, as shown in FIGS. 1, 4-6, and 15. In another embodiment, one end of the tape 12 may be detachably secured to the shuttle and one end is secured to a power reel, as shown in FIG. 7. In another embodiment, a cable is used, and the cable is wrapped around a drum, driven by the motor, as shown in FIGS. 8-9. In another embodiment, the tape 12 is a continuous tape that runs as a conveyor belt along the launcher rail, as shown in FIGS. 11-12. In another embodiment, a steel cable or rope may be wound around a pair of drums 90, as shown in FIG. 13. In another embodiment, an alternate braking system may be provided, as shown in FIGS. 14A-B. Each of these embodiments is described in further detail below.

The tape 12 may be formed of a material that has more elasticity or stretch than cables used in typical launching systems. For example, the tape 12 may be formed from nylon, a nylon blend, or another synthetic material. In some embodiments, the tape may be formed of a material that has an amount of inherent stretch. The stretch inherent in the material used can help mitigate the g-force during the initial application of launch load. However, the stretch of the material is not required. In other embodiments, tapes or belts containing metallic reinforcing fibers may be used. The electronic control system in conjunction with the electric motor can be used to tightly control the acceleration profile of the launch cycle.

In the embodiment shown in FIG. 1, a tape 12 is attached at one end to a power reel 30, which is mounted to a drive shaft 32 of an electric motor 34. Details of the electric motor are described more below, but in one embodiment, the electric motor 26 may be a DC motor. The electric motor 34 is what drives movement of the tape 12. In use, the electric motor 34 remains stationary with respect to the launcher rail 16 and the remainder of the shuttle guiding components.

The opposite end of the tape 12 may be attached to a payout reel 36. As shown in FIG. 1, the payout reel 36 may generally be positioned near a battery position end 38, and the power reel 30 is generally positioned near a launching point 40 of the launching system 10. Once the electric motor 34 is energized, the motor rotates the power reel 30, which winds in the tape 12 from the payout reel 36. This winding of the tape 12 accelerates the shuttle 14, which is attached to the tape 12 (and consequently accelerates the UAV, which is attached to the shuttle 14). The payout reel 36 contains at least a sufficient length of tape 12 that allows full travel of the shuttle 34 up the rail.

As shown in FIG. 1, the shuttle 14 may be connected to the tape 12 via a hook 26 (or some other detachable connection on the undercarriage of the shuttle 14) that attaches to an interface 22 on the tape. In the embodiment shown, the interface 22 is provided as a pin, protrusion 28, or other raised structure that can interface with the shuttle hook. Actuation of the electric motor 34 causes movement of the shuttle 14 along the power zone 100. The shuttle 14 accelerates to launch velocity over the entire length of the tape 12 in this zone 100. It should be understood that the rail is not shown in FIG. 1 and that there will be sufficient rail length beyond the shuttle to tape separation point 40 in order to bring the shuttle to an abrupt stop.

FIGS. 3A-C show a sequential series illustrating a shuttle 14 with a UAV 70 positioned thereon, and its travel along the tape 12. In FIG. 3A, the shuttle 14 is shown traveling along the rail 16. In FIG. 3B, the shuttle 14 is shown engaging an arrestment strap 72. The arrestment strap 72 functions to stop forward momentum of the shuttle 14. In this figure, the shuttle 14 has just engaged the arrestment strap 72 and the UAV 70 is ready to depart the shuttle 14. In FIG. 3C, the arrestment strap 72 has stretched to absorb shuttle energy, and the UAV 70 has been released.

In some examples, when the shuttle 14 reaches a shuttle to tape separation point 40 or another launching point, the shuttle 14 may be released from the tape 12. This release generally occurs once the interface 22 on the tape is wrapped around the end of the power reel 30, as shown in FIG. 4.

Figure 4:
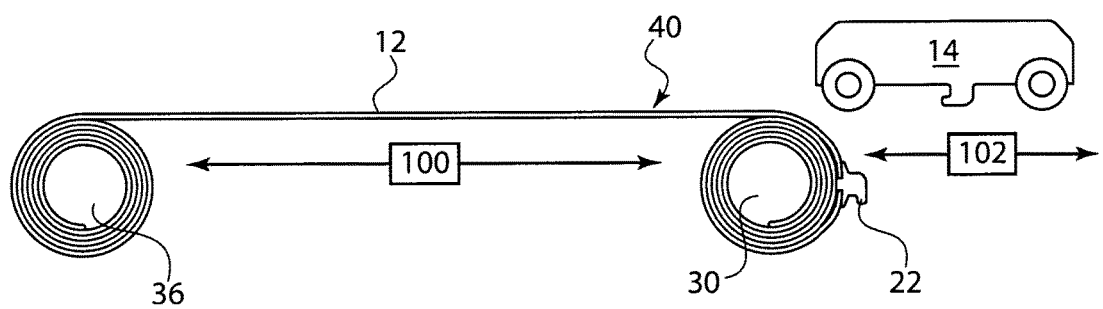
FIG. 4 shows a side plan schematic view of the launching system of FIG. 1, with the shuttle being detached from the tape.

In the embodiment of FIG. 4 and FIGS. 17-22, the shuttle 14 is allowed to release from the tape 12. A shuttle 14 that separates from the tape 12 can eliminate the need for precise timing because the tape does not have to stop at a particular point. Stopping the released shuttle 14 may be accomplished via an arrestment strap, a braking mechanism at the end of the rail, a braking system on-board the shuttle itself, or any other appropriate system. As shown in FIG. 4 (and as also illustrated by the launch series of FIGS. 3A-C), an abrupt stop of the shuttle 14 in the shuttle braking zone 102 may release the UAV from the shuttle 14. (This may be in addition to the shuttle 14 also releasing from the tape 12.)

Regarding the detachable shuttle embodiments, during a launch sequence, there is a tremendous amount of inertia developed that must be stopped in a very short amount of time. When the propulsion system is stopped/braked, it forces detachment of the UAV from the shuttle. It is desirable for this stop to be as abrupt as possible in order to allow a quick and clean UAV separation. However, in most launcher systems, the shuttle is attached to the propulsion system such that the entire system (e.g., the propulsion system and the shuttle) must be stopped before the shuttle reaches the end of the rail. The present inventors have determined that providing a system that allows detachment of the shuttle from the propulsion system can provide benefits.

In particular, if the shuttle 14 can be arrested quickly but does not need to be stopped at the same time as the propulsion system, the launch rail length can be minimized. In one example, a system 150 for allowing detachment of the shuttle is illustrated by FIGS. 17-22. The detachable shuttle system 150 is generally geared toward separating the inertia of the propulsion system from that of the shuttle. It allows the propulsion system (of which the tape 12 is part) and the shuttle 14 to be arrested using different methods, which can allow the propulsion system to have a greater run-out.

As described, the connection between the shuttle 14 and the propulsion system may be made through a tape 12. The tape 12 may be nylon tape or any other appropriate material. In the example shown by FIG. 17, the detachable shuttle system 150 is provided as a pawl and ratchet system 152. A rotary assembly 154 may include two side wheels 156, 158 with pins or rods 160, 162 extending therebetween. The wheels are generally not the wheels associated with the shuttle 14 for its movement along the rails, but form a part of the rotary assembly 154. (The shuttle wheels are shown as reference numerals 15 on FIG. 19.) Although the rotary assembly wheels 156, 158 are shown as being generally circular with perimeters having a series of notches, it should be understood that any other shapes are possible. It is generally desirable that whichever shape is used, it be consistent between each side 156, 158 so that they ratchet and unlatch similarly, as described further below.

Figure 18:
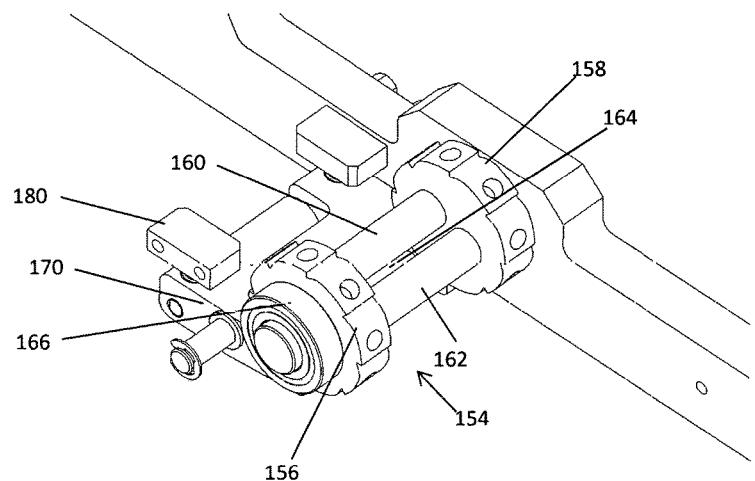
FIG. 18 is a top perspective view of a rotary assembly of a detachable shuttle system.
Figure 19:
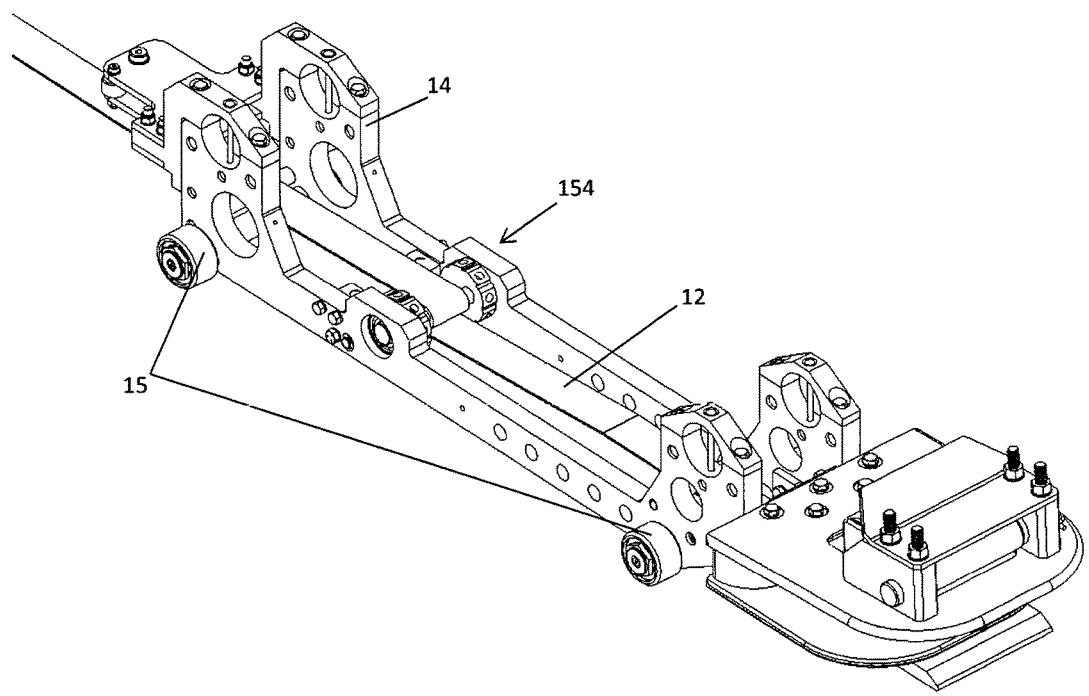
FIG. 19 is a top perspective view of the detachable shuttle system of FIGS. 17 and 18 with a shuttle attached thereto.
Figure 20:
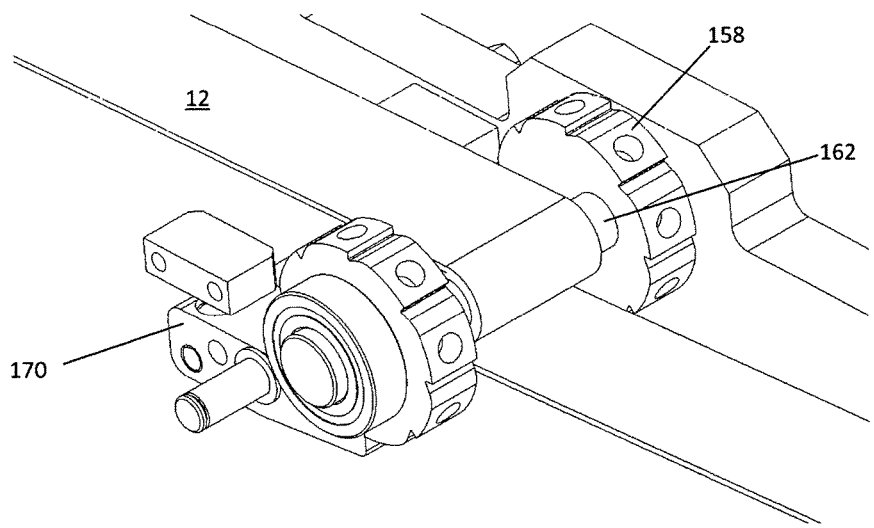
FIG. 20 is a top perspective view of a detachable shuttle system with launcher tape engaged within the rotary assembly.

Extending between the two side wheels 156, 158 may be two rods 160, 162. Each of the rods has a first end secured to the first wheel 156 and a second end secured to the second wheel 158. The rods 160, 162 are generally positioned to be parallel to one another. As shown by FIG. 18, a space 164 is allowed to be present between the two rods, which provides an area in which the tape 12 may be wound. This is illustrated by FIGS. 19 and 20. The tape 12 is routed between the two parallel rods 160, 162 that are attached to the rotary assembly 154 and the space 164. The size of the space 164 may vary depending upon the thickness of the tape or cable used. FIG. 18 illustrates the wheel connection surface 166, which is a surface at which the wheel 156 cooperates with or is otherwise connected to the shuttle 14. FIG. 19 illustrates tape wound between the rods 60, 162, with a shuttle 14 in place. FIG. 20 illustrates a close up view of the wound tape.

Figure 17:
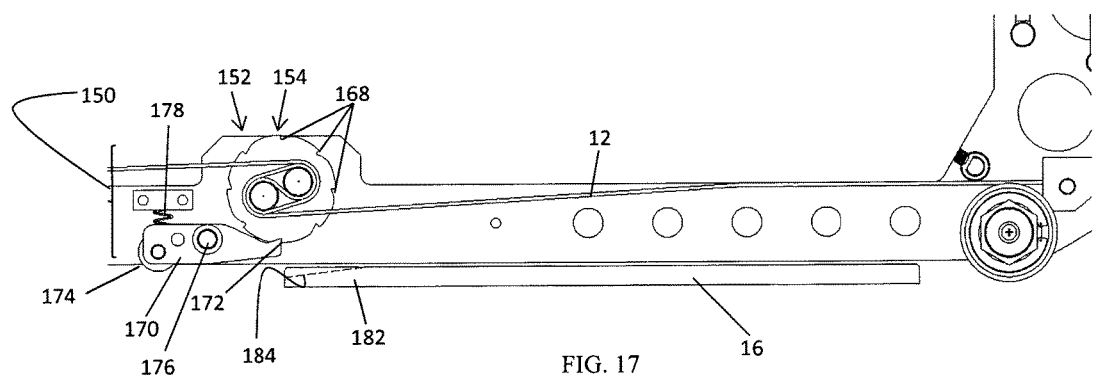
FIG. 17 is a side cross-sectional view of one example of a detachable shuttle system.
Figure 21:
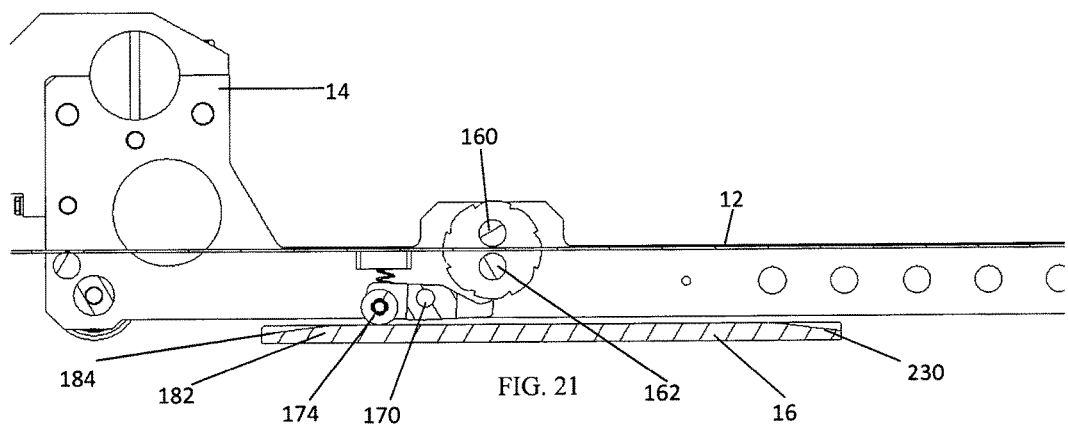
FIG. 21 is a side cross-sectional view of the detachable shuttle system of FIG. 17 with the tape unwound from the rotary assembly.
Figure 22:
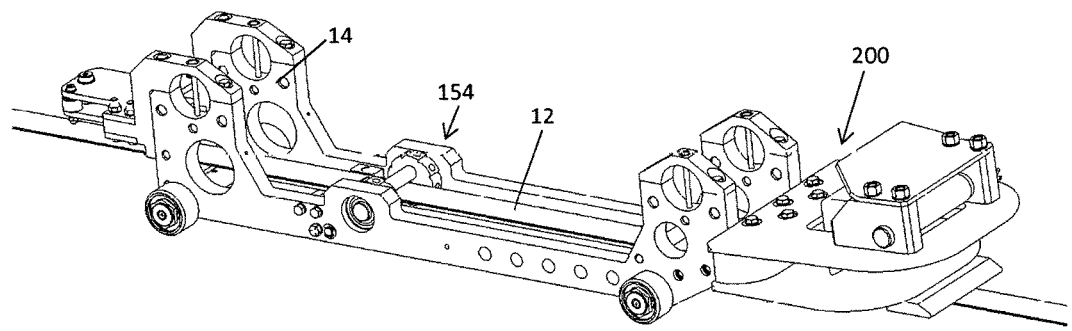
FIG. 22 is a side perspective view of the system of FIG. 21.

Referring back to the side cross-sectional view of FIG. 17 showing the rotary assembly 54 (and which only shows a single wheel 156, but it should be understood that the second wheel 158 is also present on the system and has features similar to those described below), the wheel 156 is provided with a plurality of indentations or notches 168 around its perimeter. The notches 168 function much like ratchets in use. For example, each of the wheels 156, 158 is associated with a corresponding pawl 170. The pawl 170 may be secured to a support block 180 on the shuttle 14. The pawl 170 has a catch element 172 that is designed to engage and catch within one of the notches 168 of the wheel 156. When the pawl 170 is engaged in a notch 168, the wheels are stabilized and the wound tape 12 is secured between rods 160, 162. When the pawl 170 is released, the wheels 156, 158 are allowed to freely spin. Spinning of the wheels causes the tape to unwind from between the rods 160, 162. One example of the unwound tape 12 is illustrated by FIGS. 21 and 22. In this shuttle disengaged state, the rods 160, 162 sit vertically with respect to each other and provide a clear path for the tape 12 to travel between them. Unwinding of the tape 12 from the rods 160, 162 releases the shuttle 14 from the tape, such that it is freely slidable with respect thereto. Further movement of the tape 12 does not cause further movement of the shuttle 14.

In use, to engage the shuttle attachment/detachment system 150, the rotary assembly 154 is turned such that the tape 12 is wrapped around the two rods 160, 162. This secures the tape 12 in place and anchors the shuttle 14 to the tape 12. The tape 12 is under tension. In this engaged state, the rods are generally not vertical with respect one another, but are offset at an angle such that the tape 12 is held taut between the rods. The rotary assembly 154 is held in place by the pawl 170 that engages a notched recess 168 on the perimeter of each wheel 156, 158 of the rotary assembly 154.

Operation of the pawl 170 now be described. In one example, the pawl 170 is provided with a roller base 174. The roller base 174 allows the pawl 170 to move with respect to the rotary assembly 154. The pawl 170 is also illustrated as having a pivot point 176 and a spring 178. The spring biases 178 the pawl 170 in the latched/engaged position with respect to the notch 168. The pivot point secures the pawl 170 with respect to support block 180 of the shuttle and allows it to pivot with respect thereto.

The launcher rail 16 may be provided with a disengagement ramp 182 toward its end. The location of disengagement ramp 182 should be generally positioned at the point at which it is desirable for the shuttle 14 to disengage from the propulsion system/tape 12. In one example, the disengagement ramp 182 is positioned directly before the arrestment strap (or straps), as described in more detail below.

During the launch sequence, the pawl 170 secures the rotary assembly 154 until the end of the power stroke. At the end of the power stroke, the disengagement ramp 182 located on the launcher rail 16 engages the pawl 170. Specifically, the roller base 174 of the pawl 170 approaches an inclined portion 184 of the ramp 182, which causes the roller base to rise, compress spring 178 and hinge at pivot point 176. These movements release the catch element 172 from the notch 168. Release of the catch element 172 allows the rotary assembly 154/wheels to freely spin, and the tape 12 to release from the rods 160, 162, allowing unravel and release of the tape 12. Because the tape 12 was under tension, release of the catch element 172 forces the wheels 156, 158 to rapidly spin/freewheel/free spool/and the tape to rapidly unravel/release. This disconnects/releases the shuttle 14 from the drive/propulsion system. Because the tape can free spool, the drive motor does not have to be stopped as quickly as it would otherwise be if the shuttle and the drive/propulsion system remained connected. A shorter rail length may thus be used. A smaller brake for the drive system may thus be used. The end of the disengagement ramp 182 may have a corresponding downward slope 230, illustrated by FIG. 21.

At the end of the launch sequence, the shuttle 14 must be brought to a stop in a very short distance. For example, the rapid deceleration of the shuttle allows for a quick and seamless separation of the UAV from the shuttle interface. It is also advantageous to stop the shuttle in a short distance to limit the amount of additional rail and supporting structure required. Once the tape 12 is released, the shuttle 14 can be stopped using any means required to bring it to an abrupt stop. Some non-limiting arrestment examples are described herein. For example, an arrestment strap 72 that may engage a front portion of the shuttle is illustrated by FIGS. 3A and 3B. Likewise, the propulsion system can be stopped using a separate braking means which may not require the abruptness.

Referring more specifically to arrestment of the shuttle 14 once it has been released from the tape 12, a single arrestment strap 72 may be used. However, in the case where a single arrestment strap 72 is used to decelerate a shuttle at the end of a launch sequence, failure of the strap 72 can lead to damage of other critical and expensive components. This damage can lead to significant system downtime depending on the scale of the damage.

Figure 23:
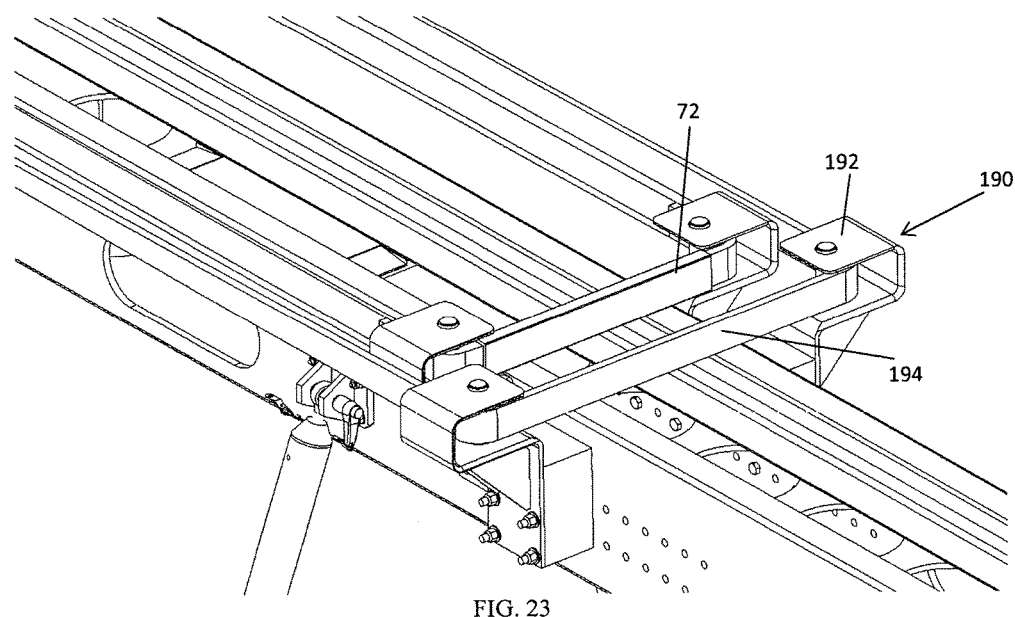
FIG. 23 is a top perspective view of primary and secondary arrestment straps.
Figure 24:
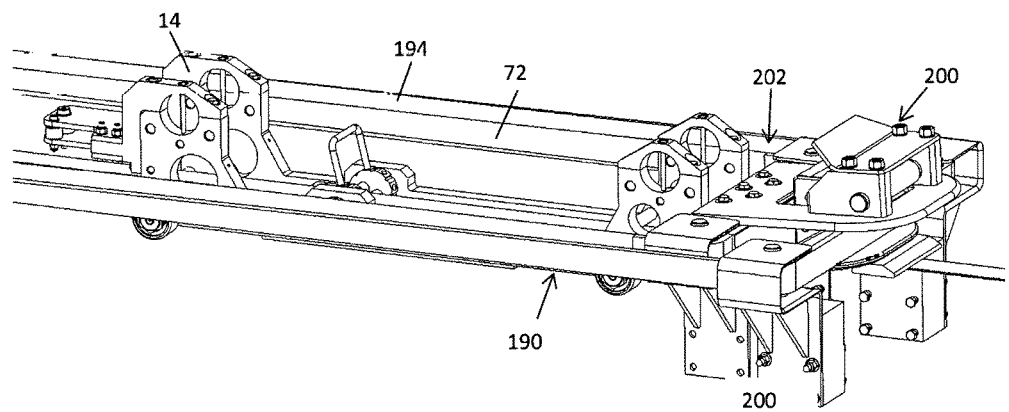
FIG. 24 is a side perspective view of the arrestment straps of FIG. 23 during shuttle engagement.
Figure 25:
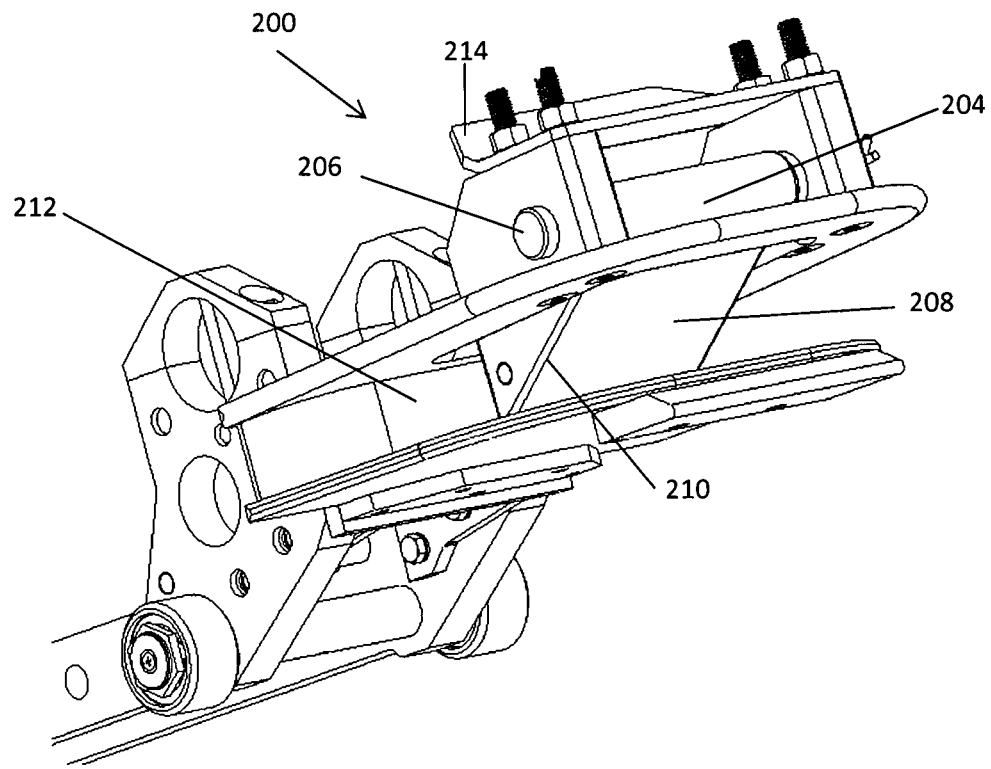
FIG. 25 is a front perspective view of one example of an anti-rollback latch system.

Accordingly, one of the improved features provided herein is providing a secondary arrestment strap 190, as illustrated by FIGS. 23 and 24. This secondary arrestment strap 190 is provided directly adjacent to the first arrestment strap 72. One benefit of providing a secondary strap 190 is that it acts as a failsafe that can help prevent catastrophic damage in the event of the failure of the primary strap 72. Use of a secondary strap 190 can also help mitigate and dampen harmonic motion in the case where both straps 72, 190 are captured by the shuttle during arrestment. Although an example with two straps 72, 190 is shown and illustrated, it should be understood that even additional straps may be provided. For example, three, four, five or more straps may be used. The general concept is to provide one or more backup arrestment straps.

As shown by FIGS. 23 and 24, the secondary arrestment strap 190 may have housing ends 192 that support a strap 194. The strap 194 is shown generally positioned alongside and outside the length of the primary strap 72. The secondary arrestment strap 190 is shown positioned in close proximity to the primary strap 72. In one specific example, the distance between straps may be about five inches. Increasing the distance can force more energy to be absorbed by the primary strap prior to engaging the secondary strap. It is possible to vary the distance between the straps in order to define an optimum separation distance through testing. In some examples, the straps may stretch about two to three feet in use. However, it should be understood that the distance between the straps and the stretch distance of the straps may be varied depending upon the resiliency of the straps used, the size of the launcher rail, the size of the shuttle, and any other varying parameters.

In a system where the shuttle 14 detaches from the propulsion system, the shuttle must be stopped separately. However, once the shuttle 14 has detached from the tape 12 and has been arrested (e.g., via one or more arrestment straps or features), it may be desirable to stop rollback of the shuttle 14 back down the launcher rail 16. If a strap, rope, or spring is used to decelerate the shuttle, there is a need to prevent recoil action where the shuttle is free to accelerate backwards down the rail and potentially damage system components. Specifically, when one or more arrestment straps are used to stop forward movement of the shuttle in the launching direction, it is possible for the straps to function like a reverse slingshot, forcing the shuttle quickly in the reverse direction, back down the rail. This can be undesirable for safety and potential damage reasons. One exemplary solution provided for preventing rollback of the shuttle 15 is an anti-rollback latch system 200. This is illustrated by FIGS. 24-27

The anti-latch system 200 is designed to capture an arrestment strap 72, 194, or any other feature positioned at the end of the launcher rail 16 and that stops the shuttle 14. As illustrated by FIG. 24, one example of an anti-rollback latch system 200 may be positioned at the front nose 202 of the shuttle 14. The latch system 200 may include a pivoting latch 204. The pivoting latch 204 may rotate about a hinge pin 206. The pivoting latch 204 may be provided at having a rearward angled face 208. This angled face 208 provides a strap engagement surface, as described further below. The angled face 208 may have beveled edges 210.

Figure 26:
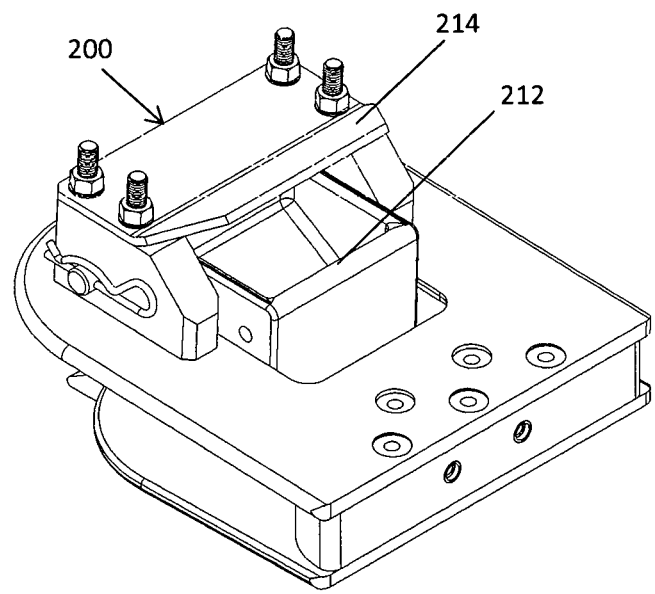
FIG. 26 is a rear perspective view of the anti-rollback latch system of FIG. 25.

The latch system 200 may also include a strap shoe 212. The strap shoe 212 provides a surface that can engage an arrestment strap during shuttle arrestment. It functions much like a back stop. The latch system 200 may also have a latch stop 214. The latch stop 214 may be an upwardly angled flange positioned above the pivoting latch 204. The latch stop 214 can provide a physical stop that prevents the pivoting latch 204 from opening further. The latch stop 214 can also provide a latch closing function. The weight and speed with which the latch 204 hits the latch stop 214 can cause the momentum of the latch 204 to swing back down, trapping the arrestment strap. In another example, the latch stop 214 may have some flexibility and the rebound force of the latch 204 hitting the latch stop 214 may force the latch closed. In another example, the latch stop 214 may be spring-loaded such that the spring can be compressed upon contact of the latch 204 with the latch stop 214. Rebound force of the spring can then force closing movement of the latch 204. Other stop features or functions are possible and considered within the scope of this disclosure. FIG. 26 illustrates a rear perspective view of an anti-rollback latch system 200, showing the latch stop 214 and shuttle connection features 216. Shuttle connection features 216 provide a connection between the system 200 and the shuttle 14 and may be openings for receiving screws or any other type of fastener.

Figure 27A:
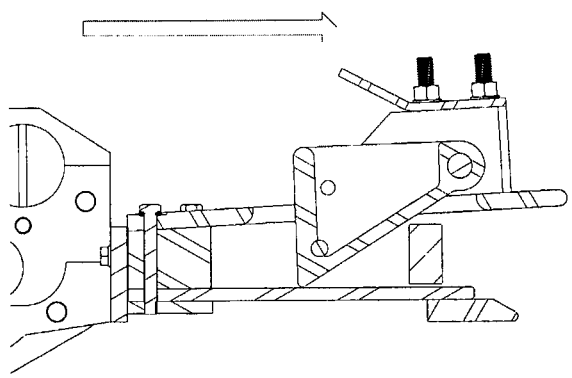
FIGS. 27A-27E illustrate side plan views of operation of an anti-rollback latch system.

The function of the anti-rollback latch system 200 in use and its engagement sequence will now be described with reference to FIGS. 27A-27E. FIG. 27A illustrates a side view of one example of an anti-rollback latch system 200 mounted to a shuttle 14. Arrow 218 illustrates the forward direction of the shuttle, up the launcher rail. In this figure, an arrestment strap 72 is shown. This could either be a primary strap 72, a secondary strap 194, or a combination of both straps pressed together when both are outstretched in use. (For simplicity, reference numeral 72 is used, but it should be understood that the primary arrestment strap 72 is not the only strap envisioned.) The arrestment strap has not yet been captured by the pivoting latch 204 in FIG. 27. The strap 72 is about to hit the latch 204.

Figure 27B:
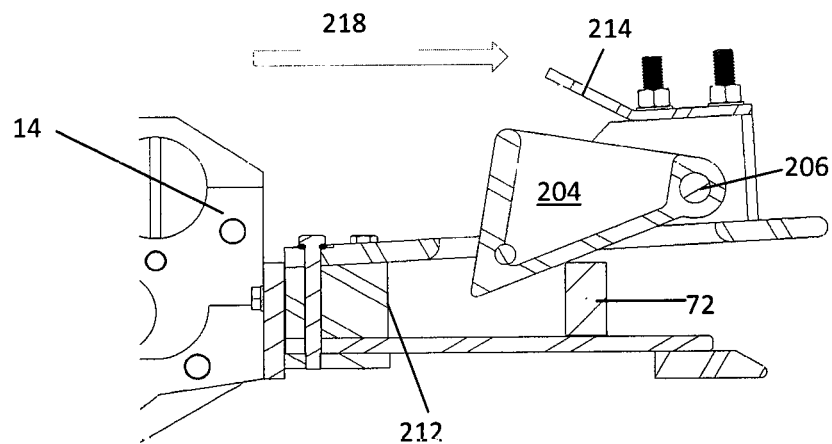
Figure 27C:
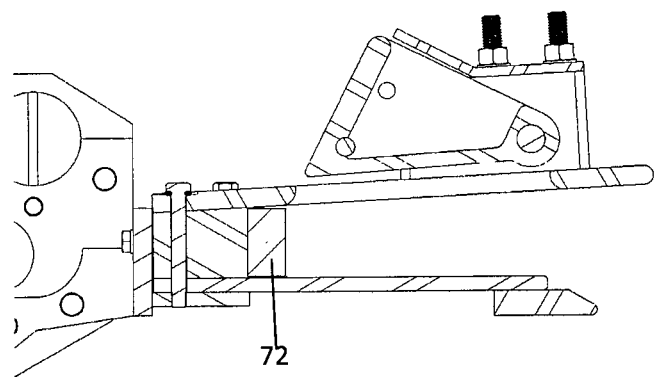
Figure 27D:
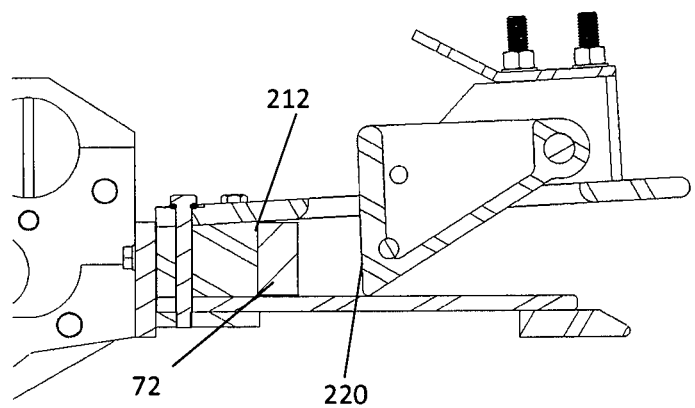
Figure 27E:
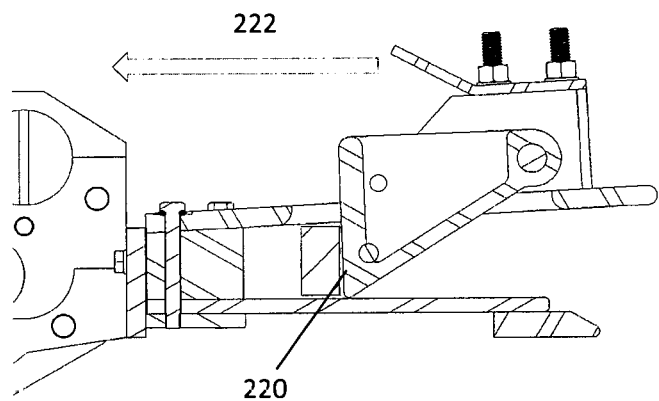

In FIG. 27B, the forward travel by the shuttle forces the strap 72 against the pivoting latch 204. The pressure of the strap 72 against the pivoting latch 204 causes the pivoting latch 204 to rotate upward. The rotation may be about the hinge pin 206. FIG. 2C illustrates continued forward travel by the shuttle. In this figure, the strap 72 abuts the strap shoe 212. This figure also illustrates the pivoting latch 204 reaching the anti-rollback latch stop 214. The latch 204 has been pushed to its maximum upward position by full passing of the strap 72. The latch 204 will then rebound off of the latch stop 214 and return to its lower position, as illustrated by FIG. 2D. When the latch 204 returns to its lower position, the strap 72 is captured between a rear face 220 of the latch 204 and the strap shoe 212.

Backward movement of the shuttle down the launch rail, which is illustrated by arrow 222, is now limited. As energy in the strap 72 is released, the strap 72 rests against rear face 220 of the pivoting latch 214.

Figure 5:
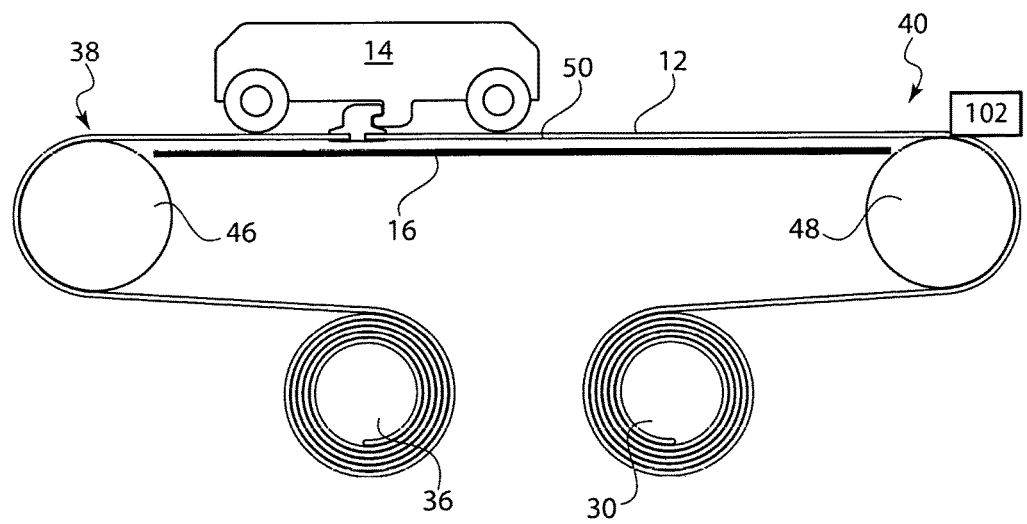
FIG. 5 shows a side plan schematic view of a launching system that uses end sheaves for controlling winding of the tape.

In the embodiment shown in FIG. 5, end sheaves or pulleys that provide a path for the tape may be mounted on or below or otherwise with respect to the launcher rail 16. A first sheave 46 may be mounted at the battery position end 38. A second sheave 48 may be mounted at or near the launching end 40. In another embodiment, the second sheave 48 may be mounted at some length before the launching end 40 of the rail 16 in order to allow distance for the shuttle 14 to be arrested at the end of the power stroke. In use, the first sheave 46 routes the tape 12 from the payout reel 36 over the upper horizontal surface 50 of the launcher rail 16 to the second sheave 48. The tape 12 may then be routed over the second sheave 48 down to the power reel 30. The power reel 30 and the payout reel 36 may be mounted to the underside of the launcher rail 16, as shown in FIG. 5. In an alternate embodiment, the power reel 30 and the payout reel 36 may be mounted to a base on which the launcher rail 16 may be mounted.

Use of first and second sheaves 46, 48 can lend advantages to the system 10. For example, the increase in the diameter of the power reel 30 due to the tape 12 being wrapped onto it during the power stroke could lead to interference with the shuttle 14. Routing the tape 12 over an end sheave 48 and positioning the power reel 30 underneath the launcher rail can lessen the chance that the increase in the tape 12 stack could impact movement of the shuttle 14. Likewise, the same condition exists at the payout reel 36 end, but the diameter of the tape 12 on the payout reel 36 decreases during the power stroke, due to the tape 12 being pulled from the payout reel 36. This could also lead to the tape 12 interfering with the launcher rail 16. Positioning the payout reel 36 under the launcher rail 16 also provides space at the battery position end 38 of the rail, where the UAV is to be loaded onto the shuttle carriage 14. Additionally, the added distance between the power reel end sheave 48 and the power reel 30 itself can allow the power stroke to be shut down prior to when the shuttle/tape interface 22 would be wrapped onto the power reel 30. Wrapping tape 12 over this interface 22 could potentially deteriorate the tape.

Figure 6:
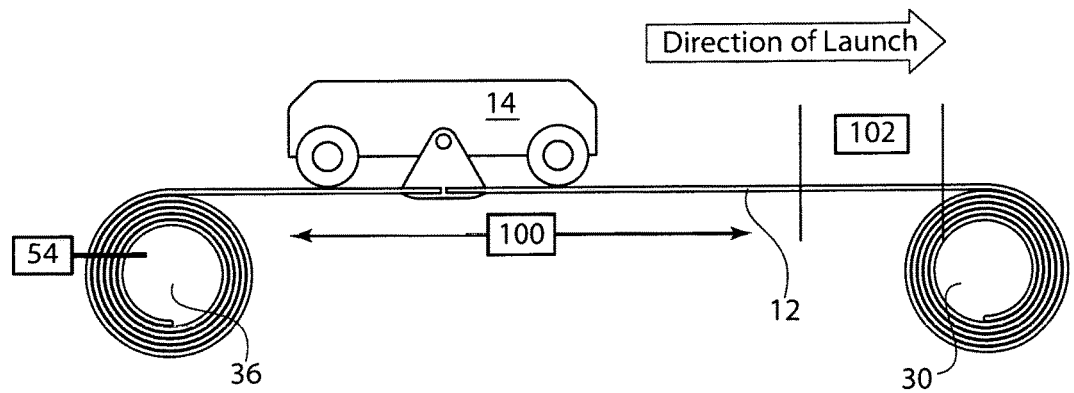
FIG. 6 shows a side plan schematic view of a launching system with a shuttle that remains secured to the tape.

In another embodiment shown in FIG. 6, the shuttle 14 may be non-removeably secured to the tape 12. For example, the undercarriage of the shuttle 14 may feature a connection that completely captures the shuttle to tape interface 22, which may be a pin or other component secured to the tape 12. The tape 12 may be manufactured from a continuous strip of material. In another example, the tape 12 may be manufactured from a non-continuous strip of material. For example, if the tape 12 is not fabricated from a single continuous strip, two sections can be used and connected to the tape interface 22. Using two tape sections may be advantageous in that the section connected to the braking reel could be fabricated from a different and potentially higher strength material to help aid in braking the weight of the shuttle. This interface 22 generally prevents the shuttle 14 from disengaging from the tape 12. As shown, the shuttle 14 stops in a braking zone 102 before the end of the rail. The UAV is released from the shuttle 14 in this braking zone 102. The tape 12 may be used to arrest the shuttle 14 via a braking system 54 contained on the payout reel 36. In one embodiment, electrically actuated brakes may be used to prohibit the use of hydraulic fluids or pneumatic brakes. An optional arrestor strap or secondary braking system (as described previously) may also be used to supplement the shuttle 14 arrestment.

In another embodiment, the payout reel 36 could be eliminated, as shown in FIG. 7. In this embodiment, the power reel 30 is used to accelerate the shuttle 14 and the tape 12. The power reel 30 may be associated with the electric motor 34 as described above. After the shuttle 14 disengages, the tape, including the interface/pin 22, would wrap completely around the power reel 30. The shuttle 14 arrestment may be through an arrestment strap, a rail based brake, or an on-board shuttle brake.

Another embodiment may use a cable 78 that is wrapped around a drum 82, driven by the motor 84. One example of which is shown in FIGS. 8 and 9. In this embodiment, the shuttle 14 has two pulleys 74, 76 located on its lower surface. One pulley 74 may serve as the launch guide for the cable 78. The other pulley 76 may serve as an arresting guide. A braking drum 80 may act as an anchor point for launch. A winding drum 82 reels in the cable 78 to propel the shuttle 14 down the rail 16. Two fixed pulley assemblies 120, 122 may be located along the rail 16, mounted to opposite sides of the rail 16. Each fixed pulley assembly 120, 122 may actually comprise two or more pulleys, as shown. In the embodiment shown, the fixed pulley assemblies 120, 122 may be located on the rail 16, at the location where the cables come in from the braking drum 80 and the winding drum 82. The cable 78 pulls against pulley 76 (on the shuttle) until the shuttle 14 crosses the rail section where the cables come in from the braking drum 80 and the winding drum 82. At that point, the cable 78 flips to pulley 74 on the shuttle for the braking action. This may be referred to as "flexing." Accordingly, when the shuttle 14 crosses the point on the rail 16 where the two fixed pulley assemblies 120, 122 are located, the cable 78 transitions from the shuttle's launch pulley 76 to its arresting pulley 74. The winding drum 82 may be stopped with a brake. The braking drum 80 may allow some pay-out of the cable 78 as it brings the shuttle 14 to a stop. FIG. 8 also shows an arresting strap 72 in place along the rail 16. The strap 72 extends along either side of the rail with a center strap portion 73 crossing over the rail.

In a specific example, a synthetic rope may be used as the cable 78. This may help alleviate possible issues with flexing a steel cable around a small pulley and then reversing the direction of flex suddenly.

Figure 10:
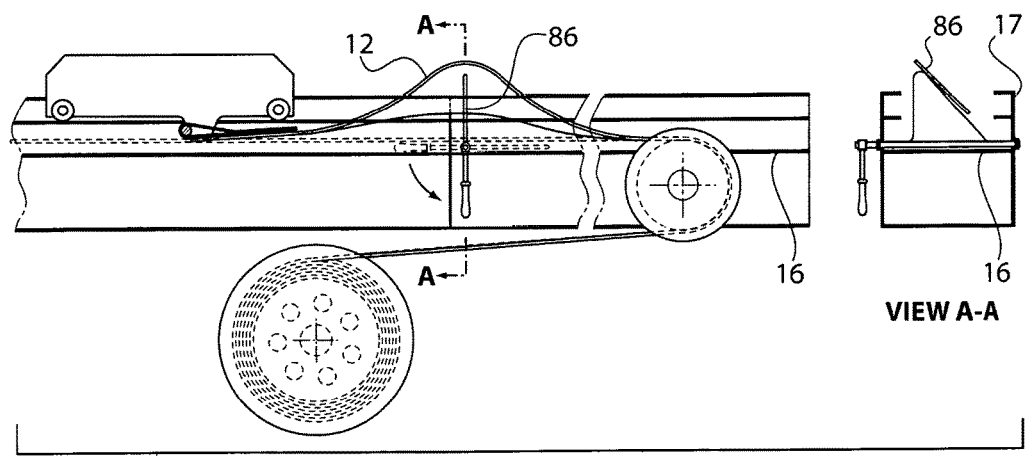
FIG. 10 shows a side view of a launching system with panels that can be used to help raise the tape for folding of the rail.

Many of the particular designs described herein have generally used a flat tape 12 that runs almost the entire length 20 of the launcher rail 16. In some embodiments, the rail 16 may need to be folded for transport and the tape may lie perpendicular to the direction of the fold. In this case, it is possible to provide a set of "paddles" 86 that may be added to the rail sections 16 adjacent to hinges. One example of this is shown in FIG. 10. The paddles 86 may be provided in order to raise one edge of the tape 12 above the rail flanges 17, such that the paddles 86 facilitate folding of the rail 16 through the thin section of the tape 12. The paddles 86 may tilt the tape 12 at an angle to allow it to fold through its thin section. In another variation, the tape 12 could be mounted at about 90 degrees to this design such that the flat section would be in the plane that the hinge rotates.

In a further embodiment shown in FIG. 11, a conveyor configuration may be used. In this embodiment, one or more electric motors 34 drive a pulley that moves a continuous loop belt or chain 56. The continuous loop belt or chain 56 can engage the shuttle 14 in any of the above-described ways. Once the shuttle 14 reaches the end of the power stroke, it disengages from the belt 56. The shuttle 14 may be arrested via an arrestment strap or any other braking system. In another embodiment, the shuttle may be securely attached to interface 22 and the braking forces applied through the conveyor belt.

FIG. 12 shows a schematic of an alternate conveyor concept. This concept utilizes a shuttle 14 that is restrained to a drive belt 56 as the tape 12 that provides a continuous loop. The shuttle 14 may function as a clamp that holds the end of the belt together. A drive motor 34 may connect to an input shaft 104. A drive pulley 106 may be connected via a sprocket and chain to the drive motor output shaft or it may be directly connected to the motor output shaft. Shuttle braking may be accomplished by variable electric braking, by an arresting strap variation, or by any other appropriate method. In this embodiment, the shuttle is connected directly to the belt to form the continuous loop. This implies that the shuttle must be stopped prior to reaching the end pulley 108 during a launch or the shuttle would attempt to wrap around 108. Another embodiment may have the shuttle 14 disconnect from the drive belt prior to reaching pulley 108.

An alternate launching embodiment is shown in FIG. 13. This concept may use a continuous steel rope 88 wound around a pair of drums 90 which have spring tension forcing them apart and applying force to increase friction between the steel rope 88 and the drums 90. One of the drums may be coupled to the drive motor assembly 92 through a belt or chain. This allows the capstan drums 90 to be mounted to the rail for ease of rail tilting for adjustment of launch angle. The shuttle 14 may be attached to the rope 88 by a mechanism 126 similar to that used for a ski lift. At the end of the stroke, variation in the shuttle wheel guide space can allow a clamping mechanism to open, and the shuttle 14 can freewheel into an arresting strap.

Figure 16:
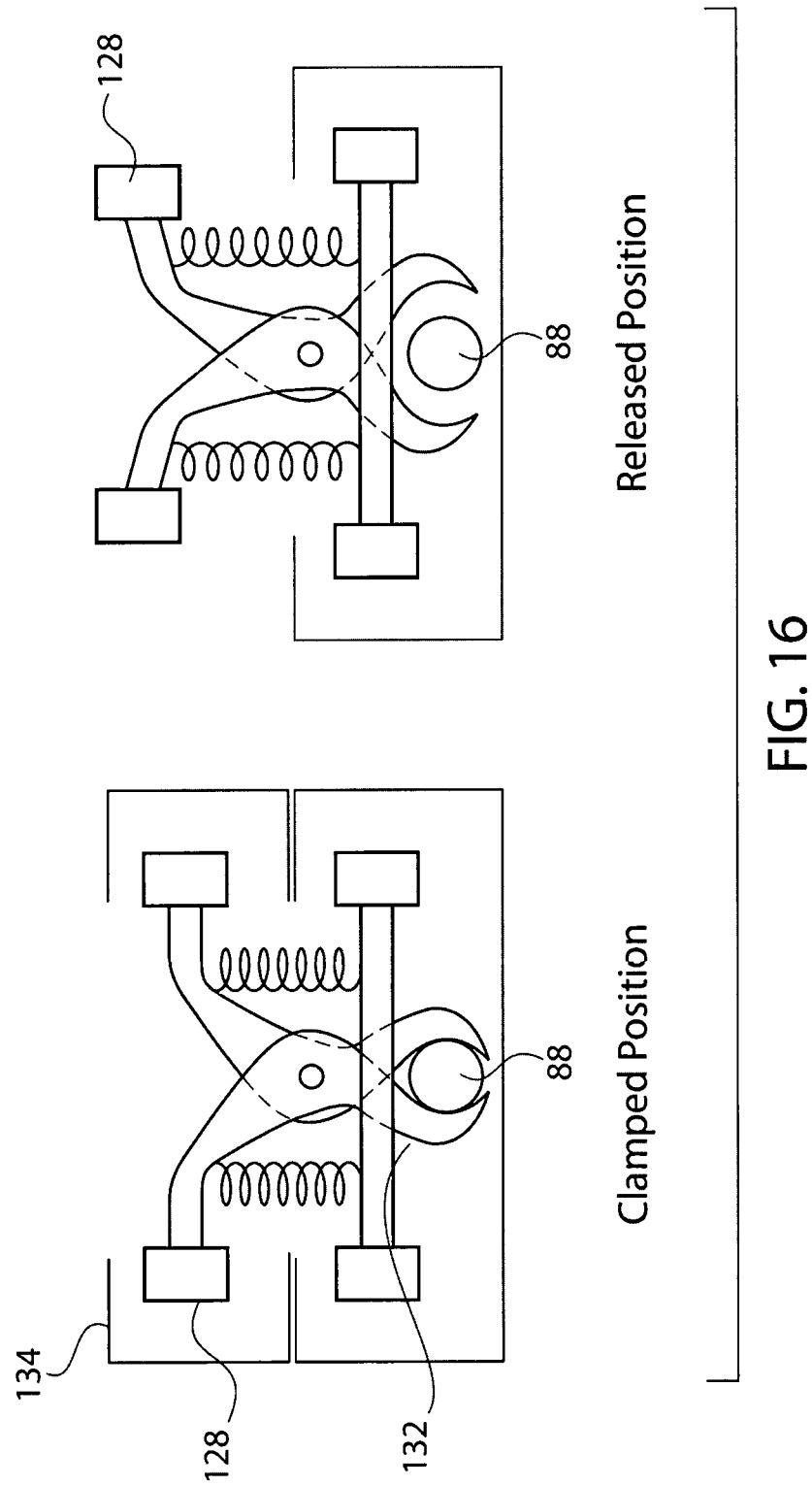
FIG. 16 shows a schematic illustration of a mechanism that may be used to secure a shuttle to a cable.

In one example, as shown in FIG. 16, the clamping mechanism 126 may be attached to the bottom of a shuttle and may be used to secure the shuttle to the cable. In the clamped position, wheels 128 may ride within rail slots in order to constrain the clamp mechanism. Upper rail guides 134 may hold the cable gripping jaws 132 closed such that the gripping jaws 132 are clamped over cable 88. In the released position, the jaws 132 release. This can be accomplished when the wheels 128, which may be spring-loaded wheels, proceed beyond the upper rail guide 134. In one embodiment, the upper rail guides are tapered along the length of the rail to allow transition from the open to the clamped position.

In another embodiment, an alternate braking mechanism may be provided. One example is shown in FIGS. 14A and B. This variation provides an arresting tape 97 that may be attached to the shuttle. For example, the back end of the shuttle 14 may be connected to an arresting tape 97 that trails behind the shuttle. The arresting tape 97 can be wound onto the tape reel 96 with a clutch, brake, and rewind motor. The launch tape 12 may be secured to the shuttle 14 using any of the options described herein. The launch tape may be driven by the drive motor assembly 94 for moving the shuttle 14 along the rail 16 as described herein. The drive reel 92 is shown directly to the right of the braking reel 96, and a sprocketed drive reel 124 is shown just under the drive reel 92. As shown, a sprocket 124 and chain may be used between the motor 94 and the drive reel 92. FIG. 14B shows a schematic of this braking option.

The launch tape 12 and the arresting tape 97 may be of different materials to obtain different performance characteristics. Although this may add drag to the system, it allows for automatic rewind and can provide a "hands off" arrangement. This may provide a launching system that can be a self-deploying launcher.

For this braking embodiment, the timing of the launch to arrestment sequence may be critical. The shuttle 14 can be traveling up to about 140-145 feet per second when the transition from launch to arrestment takes place. The timing of the launch signal may be delivered from a Programmable Logic Controller (PLC) to a drive controller in order to shift the motor from powered launch to coast, while engaging the brake. A fast responding and repeatable brake may be provided to ensure success. This system may be provided with an electric brake to eliminate the need for hydraulic braking systems. However, a hydraulic brake may be used. The brake may be variable in order to adjust to different weights and speeds.

Figure 15:
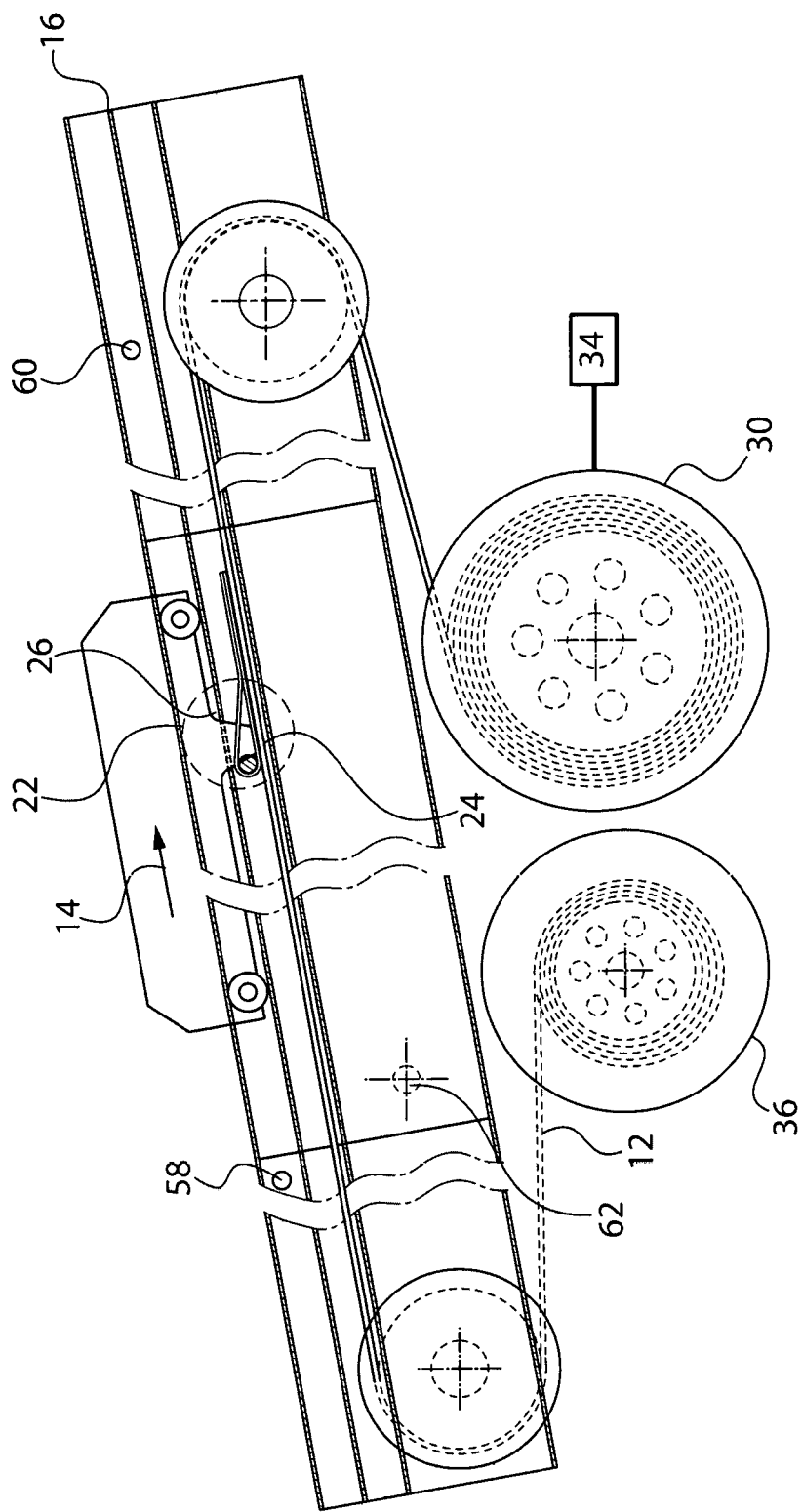
FIG. 15 shows a side plan schematic view of a launching system in use.

FIG. 15 shows one embodiment of a launcher system 10 with the launcher rail 16 inclined at an upward angle, and with the shuttle 14 positioned on the tape 12 on the rail 16. This embodiment provides a battery position sensor 58, which is activated when the shuttle 14 is in a battery, or pre-launch, position. When the shuttle 14 is pulled back to the battery position, it activates sensor 58. Activation of the sensor 58 activates a brake on the payout reel 36 to keep the tape taut. (In some embodiments, for safety purposes, the launch sequence cannot be initiated unless the shuttle has been secured in the battery position.) When launch is activated, the electric motor 34 is energized and the brake on the payout reel 36 is disengaged. Disengaging the brake allows the shuttle 14 to move along the rail 16. The motor 34 activates the power reel 30 to wind the tape, causing movement of the tape 12 and the attached shuttle 14. A power reel shutdown sensor 60 may be positioned along the rail 16, toward the launching end 40. When the shuttle 14 reaches this sensor 60, a signal is sent to the motor 34 to stop movement of the power reel 30 and/or to activate payout reel 36 brakes. The tension in the tape 12 created by the stopping and/or braking action abruptly stops the shuttle and causes release of the UAV. If the embodiment in which the shuttle releases from the tape 12 is used, then the shuttle may be stopped by an arrestment strap or other stopping features, which abruptly stops the shuttle and causes release of the UAV.

In many of the above embodiments, the electric motor 34 is shut down immediately prior to the arrestment of the shuttle 14 such that the motor does not continue to supply power and potentially damage the shuttle or drive mechanisms. The payout reel 36 may also be connected to a rewind motor that can retract the tape 12 into the battery (or launch) position such that another UAV could be quickly loaded and readied for launch. Applying the power stroke by reeling in tape 12 in this manner to achieve the launch velocity is not used on any other commercially available launchers.

In some embodiments, it has been found that a DC motor provides desirable driving features and speeds. The electric motor may be used in conjunction with a battery system to enhance portability. The battery may be a Lithium Ion battery system. The electric motor may also be used in conjunction with a Programmable Logic Controller (PLC). The PLC can allow the motor RPM (revolutions per minute) to be adjusted as required throughout the launch sequence to provide a controlled acceleration and thus mitigate the high initial G-spikes typical of a hydraulic/pneumatic system. Use of a PLC also allows the ability to dial in the launch loads, making it easy to adjust for weight or speed variances and eliminating the need for time consuming changes to the launch pre-pressure by adding or purging gas from the system. For example, the G force may be minimized by programming the shape of the G force curve in the controller.

The functions of the PLC could possibly be integrated into drive control functions and be combined into one unit. Alternatively, the PLC may be a separate component that can be optionally added to the system.

One specific embodiment of a motor that may be used with the electric launcher is a DC motor propulsion system and controller. This motor can be powered by a Lithium Ion battery. Other types of electric motors may be used. For example, an AC motor with a similar torque output may be used. However, it is believed that such an AC motor would be significantly larger and heavier than the DC motor. The DC motor was chosen for the initial application based on the ability of the batteries to supply a surge of current that is typically not available from AC power sources. Alternately, AC power with suitable transformers and discharge capability could be used to power the DC motor.

Additionally, more than one motor can be used to provide the load required for launch. Through modularization, it is possible to use multiple motors to scale up the system to accept UAV's with greater weight or where increased power is required for higher launch velocities.

Use of one or more electric motors means that the acceleration achieved can be tightly controlled along the entire length of the power stroke without the need for complicated control valves and manifolds required on hydraulic/pneumatic systems. In pneumatic and pneumatic/hydraulic systems, the maximum acceleration typically occurs at the beginning of the launch because this is where the system pressure is at its maximum. As gas expands into the cylinder, the pressure drops and the force applied to the shuttle decreases. By contrast, a constant acceleration can be provided over the entire launch stroke utilizing the electric motor-driven tape described herein, because the motor RPM can increased throughout the stroke. The use of the DC motor in conjunction with the PLC to accurately control the launch profile is a unique to many of the above-described problems with commercially available launch systems.

The use of the tape 12, which may be fabricated from nylon or some other synthetic material, offers a degree of cushioning during the initial application of the launch load since there is an inherent amount of stretch associated with this type of material. Most hydraulic/pneumatic systems connect the drive cylinder to the shuttle via a steel cable that does not have as much compliance or stretch during the application of the load and can exacerbate the g-load spikes seen. Use of a tape that has some cushioning, flexibility, stretchability or other features that allow a slight elongation and retraction of the material can be beneficial in the launching systems disclosed. It should be noted, however, that the stretch in the synthetic tape or belt is not required. Tapes or belts containing steel reinforcing fibers that would lesson or eliminate stretch may also be used. The use of a shuttle to tape interface allows the ability to control the acceleration by programmatically increasing the launch speed. This can be a prime contributor to eliminating the g-load spikes that occur with other systems.

The use of the Lithium Ion battery power source and electric motor as the drive mechanism can greatly reduce the overall system weight when judged against a comparable system containing the required hydraulic/pneumatic components (accumulator, pump, launch cylinder, gas bottle, reservoir, weight of hydraulic fluid, and so forth). It also allows for greater flexibility in the layout of the system and the ability to potentially modularize some of the subsystems. The components used may be smaller and do not require large tubes or pipes to route the pressured hydraulic fluid or gas. Power cables or flexible bus bars containing connectors can be used to route DC current from the battery to the motor. This will allow rapid replacement of a discharged battery unit.

It should be understood, however, that the battery need not be Lithium Ion. Any other battery system capable of providing the required load and discharge rates may be used. Lithium Ion was chosen for an initial application due to its low weight and rapid discharge characteristics. It is expected, however, that other battery types and systems may be used in connection with this disclosure.

Since there are no pressure vessels utilized in this disclosure, the problem of gas or hydraulic leaks has been eliminated and the overall safety of the system has been enhanced. In many of the hydraulic/pneumatic systems, the cylinder and possibly the accumulator are attached to the rail. The accumulator is often piped over to a large gas bottle that serves as a reserve vessel to store pressured $GN_2$. Due to the piping between the various hydraulic and pneumatic components, it can be difficult to allow the rail to move relative to the base if an adjustable launch angle is desired. By contrast, the ability to mount the drive motor 31 and payout reel assembly 36 to a base plate or pallet under the launcher rail 16 allows the rail to be unencumbered by excess weight and complexity. Utilizing a tape path that routes around the two end sheaves 46, 48 on the rail can allow the rail to be pivotable about an axis 62 to provide an adjustable launch angle. In an alternate embodiment, the drive pulley may be driven by the motor via a sprocket and chain. One example of this is shown in FIG. 14A.

In most operational specifications, the deployment and tear down time of the launching system are critical parameters. The time to set-up the system, bring it to ready mode, perform a launch, and then reset the system for subsequent launches is crucial. Because there is no time associated with a pressurization cycle or spinning up a flywheel when using this battery/motor/tape combination, the time to energize the system, which involves charging up a set of capacitors to achieve a ready signal following system set-up, is minimal. The batteries can be sized to achieve a number of launches before recharging is required. In a specific embodiment, the batteries can be sized to allow four launches to be achieved prior to recharging or before battery replacement is required. More or fewer launches may be provided per charge, depending upon the size of the battery selected, the weight of the UAV to be launched, and the speed of the motor required. Additional battery packs could be charged separately and swapped out to continue operation in the field without waiting for on-board batteries to recharge. In one embodiment, quick disconnects may be provided to speed the battery change over process. A greater number of launches may be possible with a larger battery configuration, but this would impact system weight. The weight to launch cycles can be optimized based on the customer requirements.

In addition to the faster time to launch, the reset time for the disclosed system is faster because retraction of the shuttle does not require the movement of hydraulic fluid back into the reservoir typical of hydraulic/pneumatic launchers. To further enhance the reset time, the payout reel 36 could be motorized to retract the shuttle 14 back into the battery position 38.

In the systems described, in one example, the operator's station may be wired, but remote from the launcher. In another example, the operator's station may be made wireless. The systems may be designed so that once set up with a UAV, they may be remote controlled.

Changes and modifications, additions and deletions may be made to the structures and methods recited above and shown in the drawings without departing from the scope or spirit of the invention and the following claims.

What is claimed is:

1. A launching system for an unmanned aerial vehicle, comprising:
   (a) a launcher rail;
   (b) a shuttle configured to travel along the launcher rail;
   (c) a drive mechanism for moving the shuttle along the launcher rail, the drive mechanism comprising (i) a length of tape running along the launcher rail, (ii) an electric drive motor that drives movement of the tape, and (iii) a drive reel to which one end of the tape is secured and around which the tape is wound during launch, wherein the shuttle is detachably secured to the tape via a rotary assembly system and a pawl, wherein engagement of the pawl with respect to the rotary assembly maintains attachment of the shuttle to the tape, wherein release of the pawl from the rotary assembly allows the shuttle to release from the tape.

2. The launching system of claim 1, wherein the rotary assembly comprises first and second wheels with first and second rods extending therebetween, the first and second rods defining a space around which the tape may be wound.

3. The launching system of claim 2, wherein the first and second wheels comprise a series of notches into which a catch element of the pawl is received.

4. The launching system of claim 1, wherein the rotary assembly comprises a connection surface at which the rotary assembly is secured to the shuttle.

5. The launching system of claim 1, wherein the pawl comprises a roller base and wherein the launcher rail comprises a disengagement ramp portion, wherein when the roller base contacts the disengagement ramp portion, the pawl is released from the rotary assembly.

6. The launching system of claim 1, wherein the tape is wound onto the drive reel during launch to accelerate the shuttle.

7. The launching system of claim 1, further comprising a payout reel having another end of the tape secured thereto.

8. The launching system of claim 1, wherein the tape is comprised of a material that offers a degree of cushioning during initial application of launch load.

9. The launching system of claim 1, wherein the tape comprises nylon or a nylon blend.

10. The launching system of claim 1, wherein the electric motor is a DC motor.

11. The launching system of claim 1, wherein the electric motor is powered by a battery.

12. The launching system of claim 1, wherein the launcher rail comprises an arrestment strap for stopping the shuttle once detached from the tape.

13. The launching system of claim 12, further comprising a secondary arrestment strap.

14. The launching system of claim 1, further comprising an anti roll-back latch system.

15. A launching system for an unmanned aerial vehicle, comprising:
   (a) a launcher rail;
   (b) a tape configured to travel a length of the launcher rail;
   (c) a shuttle secured to the tape at a shuttle to tape interface configured to allow the shuttle to detach from the tape upon launch of the unmanned aerial vehicle;
   (d) a power reel driven by an electric drive motor that drives movement of the tape;
   (e) a payout reel;
   (f) a primary arrestment strap to halt movement of the shuttle along the launcher rail after launch; and
   (g) a secondary arrestment strap.

16. The launching system of claim 15, wherein the secondary arrestment strap is positioned further along the launcher rail than the primary arrestment strap and functions as a fail safe back-up.

17. A launching system for an unmanned aerial vehicle, comprising:
   (a) a launcher rail;
   (b) a tape configured to travel a length of the launcher rail;
   (c) a shuttle secured to the tape at a shuttle to tape interface configured to allow the shuttle to detach from the tape upon launch of the unmanned aerial vehicle;
   (d) a power reel driven by an electric drive motor that drives movement of the tape;
   (e) a payout reel;
   (f) an arrestment feature to halt movement of the shuttle along the launcher rail after launch; and
   (g) an anti-rollback latch system configured to secure the shuttle to the strap and prevent its rollback after launch.

18. The launching system of claim 17, wherein the anti-rollback system comprises a pivoting latch and a hinge pin securing the pivoting latch to the shuttle.

19. The launching system of claim 18, wherein the anti-rollback system further comprises an angled face of the pivoting latch with beveled edges.

20. The launching system of claim 18, wherein the anti-rollback system further comprises a latch stop configured to stop movement of the pivoting latch and cause its closure against an arrestment feature.

\* \* \* \* \*